United States Patent
Bae

(10) Patent No.: US 11,003,336 B2
(45) Date of Patent: May 11, 2021

(54) METHOD FOR SELECTING CONTENT AND ELECTRONIC DEVICE THEREFOR

(71) Applicant: Samsung Electronics Co., Ltd., Gyeonggi-do (KR)

(72) Inventor: Soojung Bae, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/073,954

(22) PCT Filed: Jan. 19, 2017

(86) PCT No.: PCT/KR2017/000664
§ 371 (c)(1),
(2) Date: Jul. 30, 2018

(87) PCT Pub. No.: WO2017/131388
PCT Pub. Date: Aug. 3, 2017

(65) Prior Publication Data
US 2019/0042074 A1    Feb. 7, 2019

(30) Foreign Application Priority Data

Jan. 28, 2016  (KR) .................... 10-2016-0010820

(51) Int. Cl.
*G06F 3/0484*   (2013.01)
*G06F 3/0488*   (2013.01)
(Continued)

(52) U.S. Cl.
CPC ........ *G06F 3/04842* (2013.01); *G06F 3/0482* (2013.01); *G06F 3/0484* (2013.01);
(Continued)

(58) Field of Classification Search
CPC combination set(s) only.
See application file for complete search history.

(56) References Cited

U.S. PATENT DOCUMENTS 5,611,060 A * 3/1997 Belfiore ................ G06F 3/0485
715/819
6,212,577 B1 * 4/2001 Stern ...................... G06F 9/451
719/329

(Continued)

FOREIGN PATENT DOCUMENTS

| KR | 1020140079110 | 6/2014 |
| KR | 1020150026022 | 3/2015 |
| WO | WO 2014/105278 | 7/2014 |

OTHER PUBLICATIONS

PCT/ISA/210 Search Report issued on PCT/KR2017/000664 (pp. 3).

(Continued)

*Primary Examiner* — Hien L Duong
(74) *Attorney, Agent, or Firm* — The Farrell Law Firm, P.C.

(57) ABSTRACT

An electronic device according to various embodiments of the present invention includes: a display configured to display at least one content; and a processor configured to set a selection area on the basis of an input to at least one content displayed on the display, determine whether to automatically scroll or not on the basis of the attribute of the selection area, and when performing the automatic scroll, change the size of the selection area on the basis of the automatic scroll, and other embodiments may be applied.

14 Claims, 19 Drawing Sheets

(51) Int. Cl.
   *G06F 3/0485* (2013.01)
   *G06F 3/0482* (2013.01)
   *G06F 3/0354* (2013.01)

(52) U.S. Cl.
   CPC .......... *G06F 3/0485* (2013.01); *G06F 3/0488* (2013.01); *G06F 3/04883* (2013.01); *G06F 3/03543* (2013.01)

(56) References Cited

U.S. PATENT DOCUMENTS

| | | | |
|---|---|---|---|
| 8,543,934 B1* | 9/2013 | Thorsander | G06F 3/0488 715/773 |
| 2008/0297482 A1* | 12/2008 | Weiss | G06F 3/041 345/173 |
| 2009/0228842 A1* | 9/2009 | Westerman | G06F 3/04883 715/863 |
| 2010/0070898 A1* | 3/2010 | Langlois | G06F 3/0482 715/769 |
| 2011/0093811 A1 | 4/2011 | Park et al. | |
| 2011/0119714 A1* | 5/2011 | Murthy | H04N 21/4312 725/52 |
| 2012/0056836 A1* | 3/2012 | Cha | G06F 3/04842 345/173 |
| 2012/0066638 A1 | 3/2012 | Ohri | |
| 2012/0306772 A1* | 12/2012 | Tan | G06F 3/0488 345/173 |
| 2013/0290906 A1* | 10/2013 | Thorsander | G06F 3/04842 715/835 |
| 2014/0109004 A1* | 4/2014 | Sadhvani | G06F 3/0482 715/810 |
| 2015/0067504 A1 | 3/2015 | Kim et al. | |
| 2015/0067513 A1* | 3/2015 | Zambetti | H04N 1/00411 715/716 |
| 2015/0082211 A1 | 3/2015 | Lee | |
| 2015/0100916 A1* | 4/2015 | Hanumara | G06F 3/0481 715/785 |
| 2015/0135133 A1* | 5/2015 | Munoz-Bustamante | G06F 3/0485 715/785 |
| 2015/0205499 A1* | 7/2015 | Freeman | G06F 3/04845 715/711 |
| 2017/0090725 A1* | 3/2017 | Jansky | G06F 3/04842 |
| 2017/0147175 A1* | 5/2017 | Fukuda | G06F 3/0485 |

OTHER PUBLICATIONS

PCT/ISA/237 Written Opinion issued on PCT/KR2017/000664 (pp. 5).
European Search Report dated Jan. 9, 2019 issued in counterpart application No. 17744510.3-1221, 6 pages.
European Search Report dated Jun. 2, 2020 issued in counterpart application No. 17744510.3-1203, 6 pages.

* cited by examiner

METHOD FOR SELECTING CONTENT AND ELECTRONIC DEVICE THEREFOR

PRIORITY

This application is a National Phase Entry of PCT International Application No. PCT/KR2017/000664, which was filed on Jan. 19, 2017, and claims priority to Korean Patent Application No. 10-2016-0010820, which was filed on Jan. 28, 2016, the contents of each of which are incorporated herein by reference.

TECHNICAL FIELD

Various embodiments of the present disclosure relate to a method and an apparatus for changing a selection region for a content in an electronic device.

BACKGROUND ART

With the advancement of information communication technology and semiconductor technology, an electronic device is gradually evolving into a multimedia device having complex functions. For example, through applications, an electronic device can provide a user with functions, including a web search, schedule management, taking a photograph, and the like. According to the provision of such various functions, the number of contents output from an electronic device is gradually increasing. However, since an electronic device includes a display having a limited size, the electronic device may display, on the display, at least some of contents to be provided to a user, and may additionally display, on the display, the remaining contents through a scroll function.

DETAILED DESCRIPTION OF THE INVENTION

Technical Problem

An electronic device employs a display having a limited size, and thus may display, on the display, at least some of contents to be provided to a user. In this case, in order to select at least one content which is not displayed on the display, a user of the electronic device is inconvenienced in that he/she needs to additionally make an input other than the selection input having been used to select the content being displayed. For example, when a selection region for selecting a content is set, in order to set a selection region such that a content not displayed on the display is included, the user of the electronic device is inconvenienced in that he/she needs to move, to an edge region of the display, an input for setting a selection region or needs to make an additional input for scroll.

Various embodiments of the present disclosure may provide a method and an apparatus for changing a selection region for a content in an electronic device.

Technical Solution

In accordance with an aspect of the present disclosure, an electronic device is provided. The electronic device may include: a display configured to display at least one content; and a processor configured to set a selection region on the basis of an input for the at least one content displayed on the display, determine whether an automatic scroll is performed, on the basis of an attribute of the selection region, and when the automatic scroll is performed, change a size of the selection region on the basis of the automatic scroll.

In accordance with another aspect of the present disclosure, an operating method of an electronic device is provided. The operating method may include: displaying at least one content; setting a selection region on the basis of an input for the at least one content; determining whether an automatic scroll is performed, on the basis of an attribute of the selection region; and when the automatic scroll is performed, changing a size of the selection region on the basis of the automatic scroll.

Advantageous Effects

According to various embodiments, the electronic device and the method can perform, for example, when a region for selecting a content is set, an automatic scroll function on the basis of an attribute of the selection region, so as to enable a user to easily set a selection region for selecting a content.

MODE FOR CARRYING OUT THE INVENTION

Figure 1:
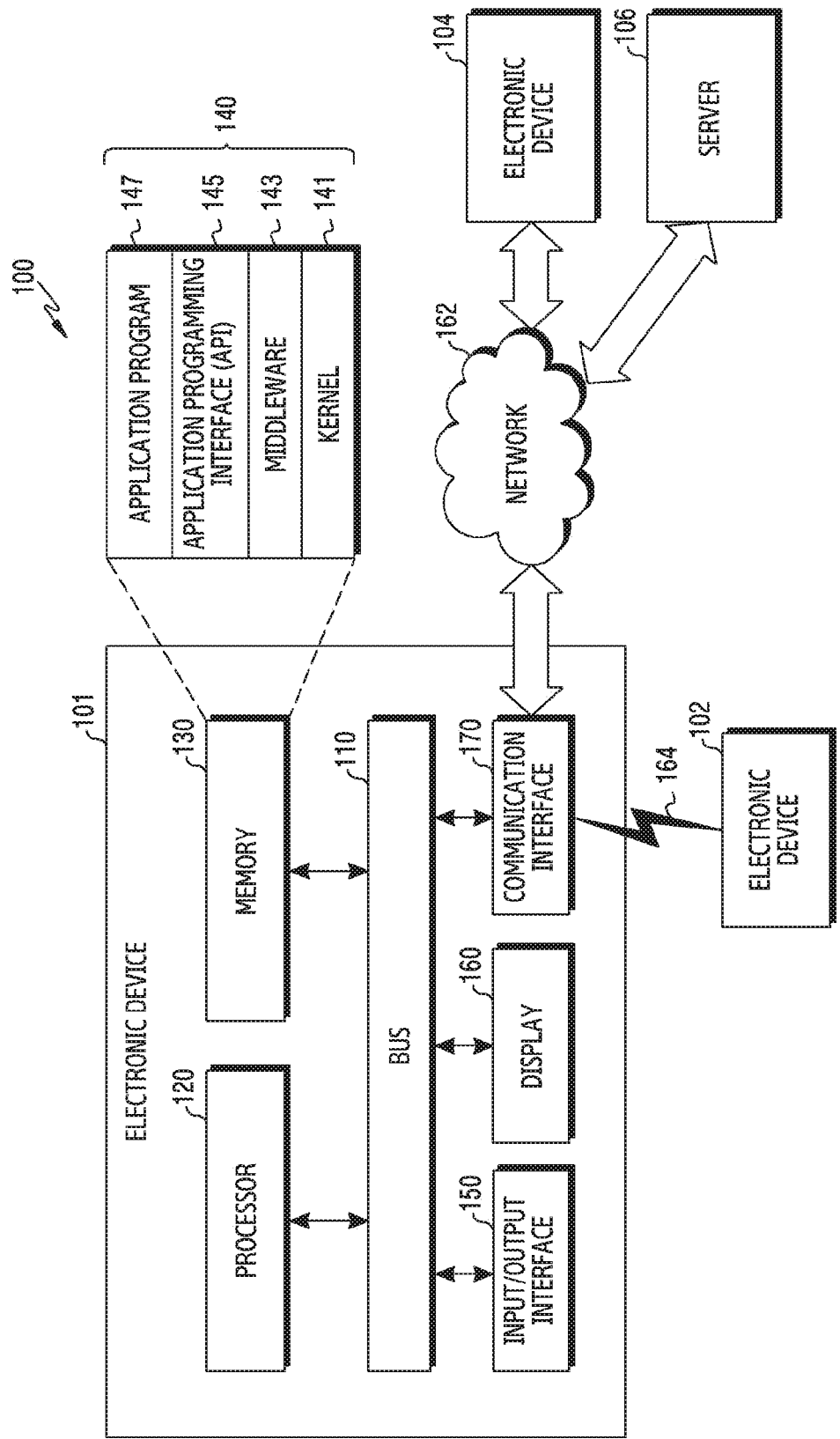
FIG. 1 illustrates a network environment including an electronic device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a view illustrating a network environment including an electronic device according to various embodiments of the present disclosure.

Referring to FIG. 1, the electronic device 101 may include a bus 110, a processor 120, a memory 130, an input/output interface 150, a display 160, and a communication interface 170. In some embodiments of the present disclosure, at least one of the above elements of the electronic device 101 may be omitted from the electronic device 101, or the electronic device 101 may additionally include other elements.

The bus 110 may include, for example, a circuit that interconnects the elements 120 to 170 and delivers a communication (e.g., a control message and/or data) between the elements.

The processor 120 may include one or more of a Central Processing Unit (CPU), an Application Processor (AP), and a Communication Processor (CP). The processor 120 may perform, for example, calculations or data processing related to control over and/or communication by at least one of the other elements of the electronic device 101.

According to an embodiment, the processor 120 may set a selection region corresponding to an input detected through the input/output interface 150. For example, when detecting a region selection event, the processor 120 may set, as a selection region for selecting at least one content, a region from a touch input point detected through a touch panel to a touch input point moved by a drag. As another example, when detecting a region selection event, the processor 120 may set, as a selection region for selecting at least one content, a region from a point, at which an input made by an electronic pen has been detected, to an input point moved by a drag. As still another example, when detecting a region selection event, the processor 120 may set, as a selection region for selecting at least one content, a region from a point, in which a mouse button has been input, to a point moved by a drag. For example, the processor 120 may detect a region selection event on the basis of a time for which an input for a content is maintained, selection of a region selection icon, a region selection event, a gesture input that a region selection event matches, and the like. For example, the processor 120 may control the display 160 such that a selection region corresponding to an input detected through the input/output interface 150 is distinguished from another region, so as to renew a graphic element (e.g., a color, a transparency, a shade, etc.) of the selection region. In the present example, the contents may include a character, an image, a video, and the like which are displayed on the display 160.

According to an embodiment, the processor 120 may perform an automatic scroll on the basis of an attribute of a selection region. For example, when the number of contents included in a selection region satisfies a reference condition, the processor 120 may perform an automatic scroll. As another example, when the size (e.g., an area) of a selection region satisfies a reference condition, the processor 120 may perform an automatic scroll. As still another example, when the size (e.g., capacity) of a content included in a selection region satisfies a reference condition, the processor 120 may perform an automatic scroll. For example, when an input for setting a selection region is canceled during execution of an automatic scroll, the processor 120 may terminate the automatic scroll. When an input for setting a selection region is maintained, the processor 120 may perform an automatic scroll to an extension range of the selection region. In the present example, a reference condition is a value corresponding to an attribute of a content included in a selection region, and examples of the reference condition may include the reference number of contents, a reference area, a reference size, and the like. Examples of an attribute of a content may include the type of content, the type of application for displaying a content, and the like. Examples of an attribute of a selection region may include the number of contents included in the selection region, the sizes (e.g., capacities) of the contents, the size (e.g., the area) of the selection region, and the like.

According to an embodiment, the processor 120 may identify an extensible range of a selection region so as to perform an automatic scroll up to the extensible range and change the selection region. For example, the processor 120 may identify an extensible range of a selection region on the basis of whether contents displayed on the display 160 are grouped. For example, when contents are not grouped, the processor 120 may identify a point where the last content among the contents, which are output on the display 160, is located. For example, when the contents are grouped, the processor may identify an extensible range of a selection region on the basis of the type, generation information, or the like of a content included in the selection region. In the present example, the contents may be grouped based on the types of contents, generation information thereof, or the like.

According to an embodiment, when at least a part of an image is included in a selection region, the processor 120 may perform an automatic scroll on the basis of the image included in the selection region. For example, when at least a part of an image is included in a selection region, the processor 120 may perform an automatic scroll and may change the selection region so as to include the entire image. As another example, the processor 120 may determine whether an automatic scroll is performed, on the basis of the size of an image included in a selection region. When the size of an image included in a selection region satisfies a reference condition, the processor 120 may perform an automatic scroll and extend the selection region so as to include the entire image therein. When the size of the image included in the selection region does not satisfy the reference condition, so as not to include the image therein, the processor 120 may perform an automatic scroll and reduce the selection region.

The memory 130 may include a volatile memory and/or a non-volatile memory. The memory 130 may store, for example, commands or data related to at least one of the other elements of the electronic device 101. According to an embodiment of the present disclosure, the memory 130 may store software and/or a program 140. The program 140 may include, for example, a kernel 141, middleware 143, an Application Programming Interface (API) 145, and/or an application (or an application program) 147. At least some of the kernel 141, the middleware 143, and the API 145 may be referred to as an "Operating System (OS)".

For example, the input/output interface 150 may serve as an interface capable of delivering a command or data, which is input from a user or another external device, to the element(s) other than the input/output interface 150 within the electronic device 101. Also, the input/output interface 150 may output, to the user or another external device, commands or data received from the element(s) other than the input/output interface 150 within the electronic device 101. According to an embodiment, the input/output interface 150 may include a touch panel that detects a touch input or a hovering input using an electronic pen or a part of the user's body. According to an embodiment, the input/output interface 150 may receive a gesture or a hovering input using an electronic pen or a part of the user's body.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. For example, the display 160 may display various pieces of content (e.g., text, images, videos, icons, symbols, etc.) to the user.

According to an embodiment, the display 160 may be coupled to a touch panel of the input/output interface 150 so as to implement a touch screen.

The communication interface 170 may establish, for example, communication between the electronic device 101 and an external device (e.g., a first external electronic device 102, a second external electronic device 104, or a server 106). For example, the communication interface 170 may be connected to a network 162 through wireless or wired communication and may communicate with the external device (e.g., the second external electronic device 104 or the server 106).

Figure 2:
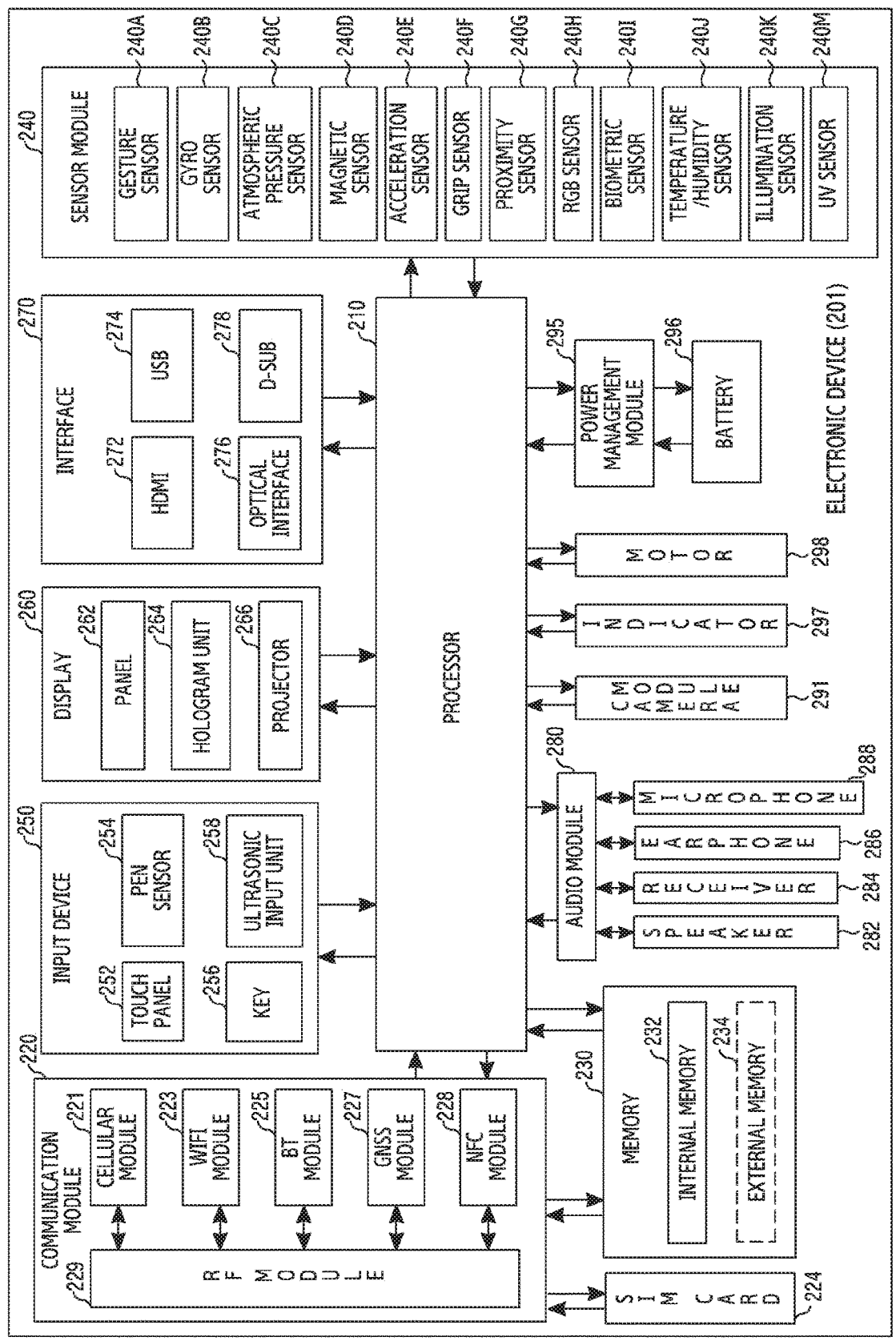
FIG. 2 illustrates a block diagram of an electronic device according to various embodiments of the present disclosure.

FIG. 2 is a view illustrating a block diagram of an electronic device 201 according to various embodiments of the present disclosure. In the present example, the electronic device 201 may include all or some of the elements of the electronic device 101 illustrated in FIG. 1.

Referring to FIG. 2, the electronic device 201 may include at least one processor (e.g., an Application Processor (AP)) 210, a communication module 220, a subscriber identification module 224, a memory 230, a sensor module 240, an input apparatus 250, a display 260, an interface 270, an audio module 280, a camera module 291, a power management module 295, a battery 296, an indicator 297, and a motor 298.

The processor 210 may control multiple hardware or software elements connected to the processor 210 by running, for example, an OS or an application program, and may perform the processing of and arithmetic operations on various data. The processor 210 may be implemented by, for example, a System on Chip (SoC). According to an embodiment, the processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

According to an embodiment, a selection region corresponds to an input detected through the input apparatus 250, and the processor 210 may change the selection region on the basis of an attribute of the selection region. For example, the processor 210 may set a selection region, which corresponds to an input detected through the input apparatus 250, on the basis of at least one of the number of contents included in the selection region, the sizes (e.g., capacities) of the contents, and the size (e.g., the area) of the selection region.

The communication module 220 may have a configuration identical or similar to that of the communication interface 170 illustrated in FIG. 1. The communication module 220 may include, for example, the cellular module 221, a WiFi module 223, a Bluetooth (BT) module 225, a GNSS module 227 (e.g., a GPS module, a GLONASS module, a BeiDou module, or a Galileo module), an NFC module 228, and a Radio Frequency (RF) module 229.

For example, the cellular module 221 may provide a voice call, a video call, a text message service, an Internet service, or the like through a communication network. According to an embodiment, the cellular module 221 may identify or authenticate an electronic device 201 in the communication network by using the subscriber identification module (e.g., a Subscriber Identity Module (SIM) card) 224. According to an embodiment, the cellular module 221 may perform at least some of the functions that the processor 210 can provide. According to an embodiment, the cellular module 221 may include a Communication Processor (CP).

Each of the WiFi module 223, the BT module 225, the GNSS module 227, and the NFC module 228 may include, for example, a processor for processing data transmitted and received through the relevant module. According to some embodiments, at least some (e.g., two or more) of the cellular module 221, the WiFi module 223, the BT module 225, the GNSS module 227, and the NFC module 228 may be included in one Integrated Chip (IC) or IC package.

The RF module 229 may transmit and receive, for example, communication signals (e.g., RF signals). The RF module 229 may include, for example, a transceiver, a Power Amplifier Module (PAM), a frequency filter, a Low Noise Amplifier (LNA), and an antenna. According to another embodiment, at least one of the cellular module 221, the WiFi module 223, the BT module 225, the GNSS module 227, and the NFC module 228 may transmit and receive RF signals through a separate RF module.

The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory (e.g., the memory 130) 230 may include, for example, an internal memory 232 or an external memory 234. The internal memory 232 may include at least one of, for example, a volatile memory (e.g., a Dynamic Random Access Memory (DRAM), a Static RAM (SRAM), a Synchronous DRAM (SDRAM), etc.); and a non-volatile memory (e.g., a One Time Programmable Read-Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a Not AND (NAND) flash memory, a Not OR (NOR) flash memory, etc.), a hard drive, and a Solid State Drive (SSD)).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

For example, the sensor module 240 may measure a physical quantity or may recognize an operation state of the electronic device 201, and may convert the measured physical quantity or the detected operation state into an electrical signal. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor (e.g., a Red-Green-Blue (RGB) sensor) 240H, a biometric sensor 240I, a temperature/humidity sensor 240J, an illuminance sensor 240K, and an Ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the processor 210, and may control the sensor module 240 while the processor 210 is in a sleep state.

The input apparatus 250 may include, for example, a touch panel 252, a (digital) pen sensor 254, a key 256, or an ultrasonic input unit 258. The touch panel 252 may use at least one of, for example, a capacitive scheme, a resistive scheme, an infrared scheme, and an acoustic wave scheme. Also, the touch panel 252 may further include a control circuit. The touch panel 252 may further include a tactile layer and may provide a tactile reaction to the user.

The (digital) pen sensor 254 may include, for example, a recognition sheet which is a part of the touch panel or is separated from the touch panel. The key 256 may be, for example, a physical button, an optical key, and a keypad. The ultrasonic input unit 258 may recognize an ultrasonic wave generated by an input means through a microphone (e.g., a microphone 288), and may identify data corresponding to the recognized ultrasonic wave.

The display (e.g., the display 160) 260 may include a panel 262, a hologram unit 264, or a projector 266. The panel 262 may include a configuration identical or similar to that of the display 160 illustrated in FIG. 1. The panel 262 may be implemented to be, for example, flexible, transparent, or wearable. The panel 262, together with the touch panel 252, may be implemented as one module. The hologram unit 264 may display a three-dimensional image in the air by using interference of light. The projector 266 may display an image by projecting light onto a screen. The screen may be located, for example, inside or outside the electronic device 201. According to an embodiment, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

For example, the audio module 280 may bidirectionally convert between a sound and an electrical signal. At least some elements of the audio module 280 may be included in, for example, the input/output interface 145 illustrated in FIG. 1. The audio module 280 may process sound information which is input or output through, for example, a speaker 282, a receiver 284, an earphone 286, the microphone 288, or the like.

The camera module 291 is, for example, a device capable of capturing a still image and a moving image. According to an embodiment, the camera module 291 may include one or more image sensors (e.g., a front sensor or a back sensor), a lens, an Image Signal Processor (ISP), and a flash (e.g., an LED, a xenon lamp, or the like).

The power management module 295 may manage, for example, power of the electronic device 201. According to an embodiment, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic method, or the like. An additional circuit for wireless charging, for example, a coil loop, a resonance circuit, or a rectifier, may be further included. The battery gauge may measure, for example, a residual charge amount of the battery 296, and a voltage, a current, or a temperature during the charging. The battery 296 may include, for example, a rechargeable battery and/or a solar battery.

The indicator 297 may display a particular state (e.g., a booting state, a message state, the state of charge, or the like) of the electronic device 201 or a part (e.g., the processor 210) thereof. The motor 298 may convert an electrical signal into a mechanical vibration, and may generate a vibration, a haptic effect, or the like. Although not illustrated, the electronic device 201 may include a processing unit (e.g., a GPU) for supporting a mobile television (TV). The processing unit for supporting a mobile TV may process media data according to a standard, such as Digital Multimedia Broadcasting (DMB), Digital Video Broadcasting (DVB), or mediaFLO™.

Each of the above-described elements according to the present disclosure may be configured with one or more components, and the names of the corresponding elements may vary based on the type of electronic device. In various embodiments, an electronic device may include at least one of the above-described elements. Some elements may be omitted from the electronic device, or other additional elements may be further included therein. Also, some of the elements of the electronic device according to various embodiments may be combined into one entity, which may perform functions identical to those of the relevant elements before the combination.

Figure 3:
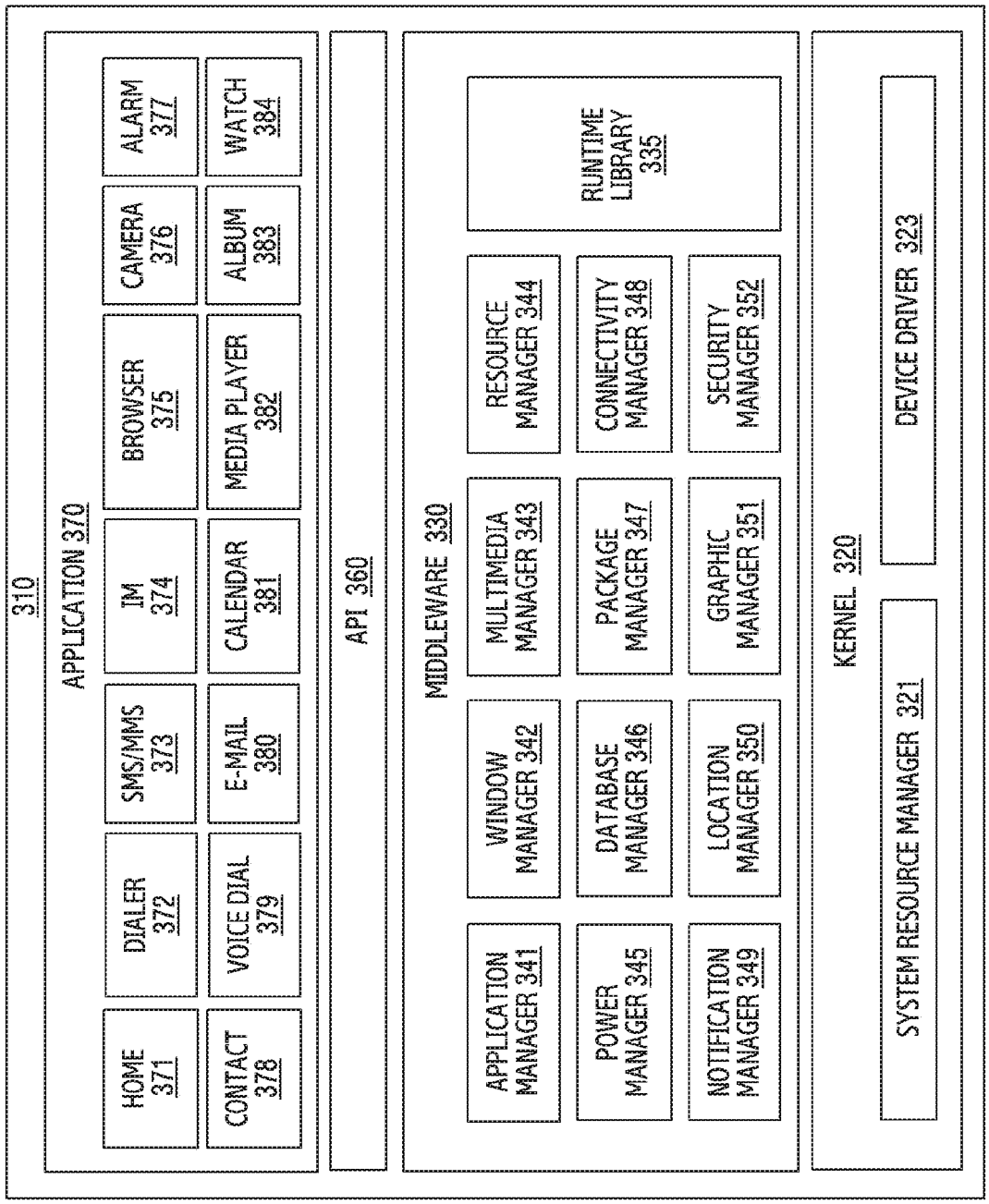
FIG. 3 illustrates a block diagram of a program module according to various embodiments of the present disclosure.

FIG. 3 is a block diagram of a program module according to various embodiments of the present disclosure.

According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. At least some of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. According to an embodiment of the present disclosure, when the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

According to an embodiment of the present disclosure, the applications 370 may include an application (hereinafter, referred to as an "information exchange application" for convenience of description) that supports exchanging information between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device (e.g., the electronic device 102 or 104) communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device (e.g., attributes of the electronic device 102 or 104). According to an embodiment of the present disclosure, the applications 370 may include an application received from an external electronic device (e.g., the server 106, or the electronic device 102 or 104). According to an embodiment of the present disclosure, the applications 370 may include a preloaded application or a third party application that may be downloaded from a server. The names of the components of the program module 310 of the illustrated embodiment of the present disclosure may change according to the type of operating system.

According to various embodiments, at least a part of the programming module 310 may be implemented in software, firmware, hardware, or a combination of two or more thereof. At least some of the program module 310 may be implemented (e.g., executed) by, for example, the processor (e.g., the processor 1410). At least some of the program module 310 may include, for example, a module, a program, a routine, a set of instructions, and/or a process for performing one or more functions.

Figure 4:
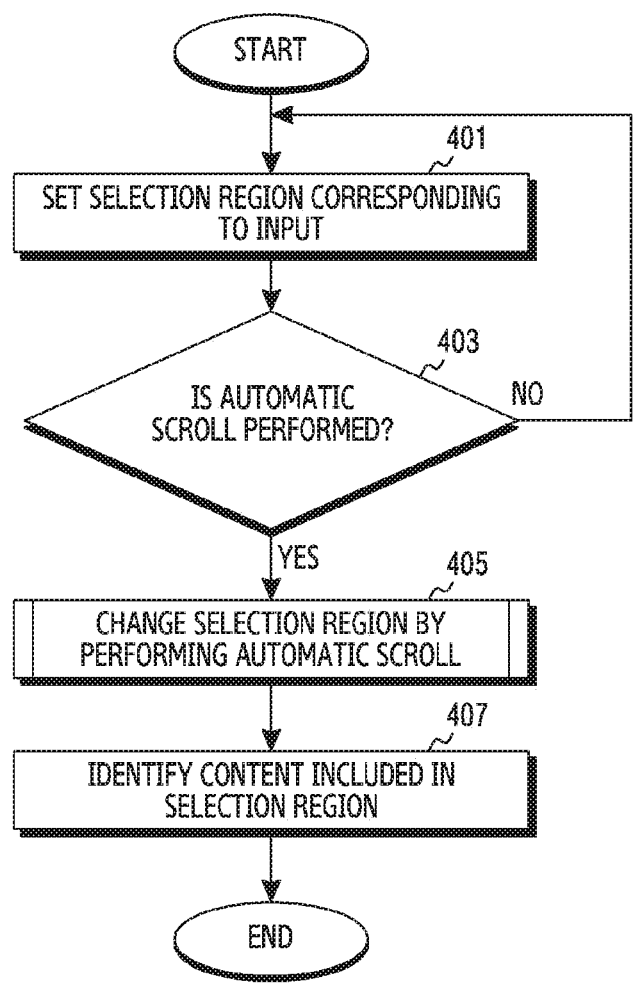
FIG. 4 is a flowchart illustrating a change of a selection region for a content by an electronic device according to various embodiments of the present disclosure.

FIG. 4 is a flowchart illustrating a change of a selection region for a content output by an electronic device according to various embodiments of the present disclosure.

Referring to FIG. 4, in operation 401, the electronic device (e.g., the electronic device 101 or 201) may set a selection region corresponding to an input. For example, when a region selection event is detected, the processor 120 may set a selection region for selecting at least one content on the basis of a start point of an input detected through the input/output interface 150 and an input point moved by a drag. For example, the processor 120 may renew a graphic element of the selection region by controlling the display 160 such that the selection region is distinguished from another region. In the present example, the contents may include a character, an image, a video, and the like which are displayed on the display 160. Examples of the input may include inputs made by a touch panel, an electronic pen, a mouse, and the like. Examples of the graphic element may include a color, a transparency, a shade, an outline, and the like.

In operation 403, the electronic device may determine whether an automatic scroll is performed, on the basis of an attribute of the selection region. For example, the processor 120 may determine whether an automatic scroll is performed, on the basis of at least one of the number of contents included in the selection region, the sizes of the contents, and the size of the selection region. For example, when characters are included in the selection region, the processor 120 may identify a reference condition corresponding to characters. When the number of the characters included in the selection region satisfies the reference condition, the processor 120 may determine that an automatic scroll condition is satisfied. For example, when an image is included in the selection region, the processor 120 may identify a reference condition corresponding to the capacity of an image. When the capacity of the image included in the selection region satisfies the reference condition, the processor 120 may determine that an automatic scroll condition is satisfied. For example, the processor 120 may identify the size of the selection region. When the size of the selection region satisfies a reference condition corresponding to the size of a selection region, the processor 120 may determine that an automatic scroll condition is satisfied.

When an automatic scroll is not performed, in operation 401, the electronic device may additionally set a selection region corresponding to an input. For example, when the number of the characters included in the selection region does not satisfy the reference condition corresponding to characters, the processor 120 may additionally set a selection region by considering an input moved by execution of a drag. As another example, when the size (e.g., capacity) of the image included in the selection region does not satisfy the reference condition corresponding to the size (e.g., capacity) of a content, the processor 120 may additionally set a selection region by considering an input moved by execution of a drag.

In operation 405, when performing the automatic scroll, the electronic device may change the selection region on the basis of the automatic scroll. For example, when the number of the characters included in the selection region satisfies the reference condition corresponding to characters, the processor 120 may identify an extensible range of the selection region. While an input for determining a selection region is maintained, the processor 120 may extend the selection region by performing an automatic scroll up to the extensible range of the selection region. When the input for determining a selection region is terminated during the execution of the automatic scroll, the processor 120 may terminate the automatic scroll. For example, when contents displayed on the display 160 are grouped, the processor 120 may identify an extensible range of the selection region on the basis of the type, generation information, and the like of a content included in the selection region. For example, when the contents displayed on the display 160 are not grouped, the processor 120 may identify the display position of the last content among the contents displayed on the display 160.

In operation 407, the electronic device may identify a content included in the selection region. For example, the processor 120 may identify a character, an image, a video, or the like included in a selection region changed by the execution of the automatic scroll.

According to an embodiment, the processor 120 may set a direction of an automatic scroll on the basis of direction information of an input for setting a selection region. For example, when an input dragged from the left to the right in order to set a selection region is detected, the processor 120 may set a direction of an automatic scroll as the right direction.

According to various embodiments of the present disclosure, the electronic device may reduce a selection region by performing an automatic scroll. For example, the processor 120 may determine whether an automatic scroll for reducing a selection region is performed, on the basis of an attribute of a selection region. When the attribute of the selection region satisfies a reference condition for reducing a selection region, the processor 120 may reduce the selection region by performing the automatic scroll. According to the reduction of the selection region, the processor 120 may cancel selection of a content which is not included in the reduced selection area. In the present example, examples of the attribute of the selection region may include the number of contents included in the selection region, the sizes (e.g., capacities) of the contents, and the size (e.g., the area) of the selection region.

Figure 5:
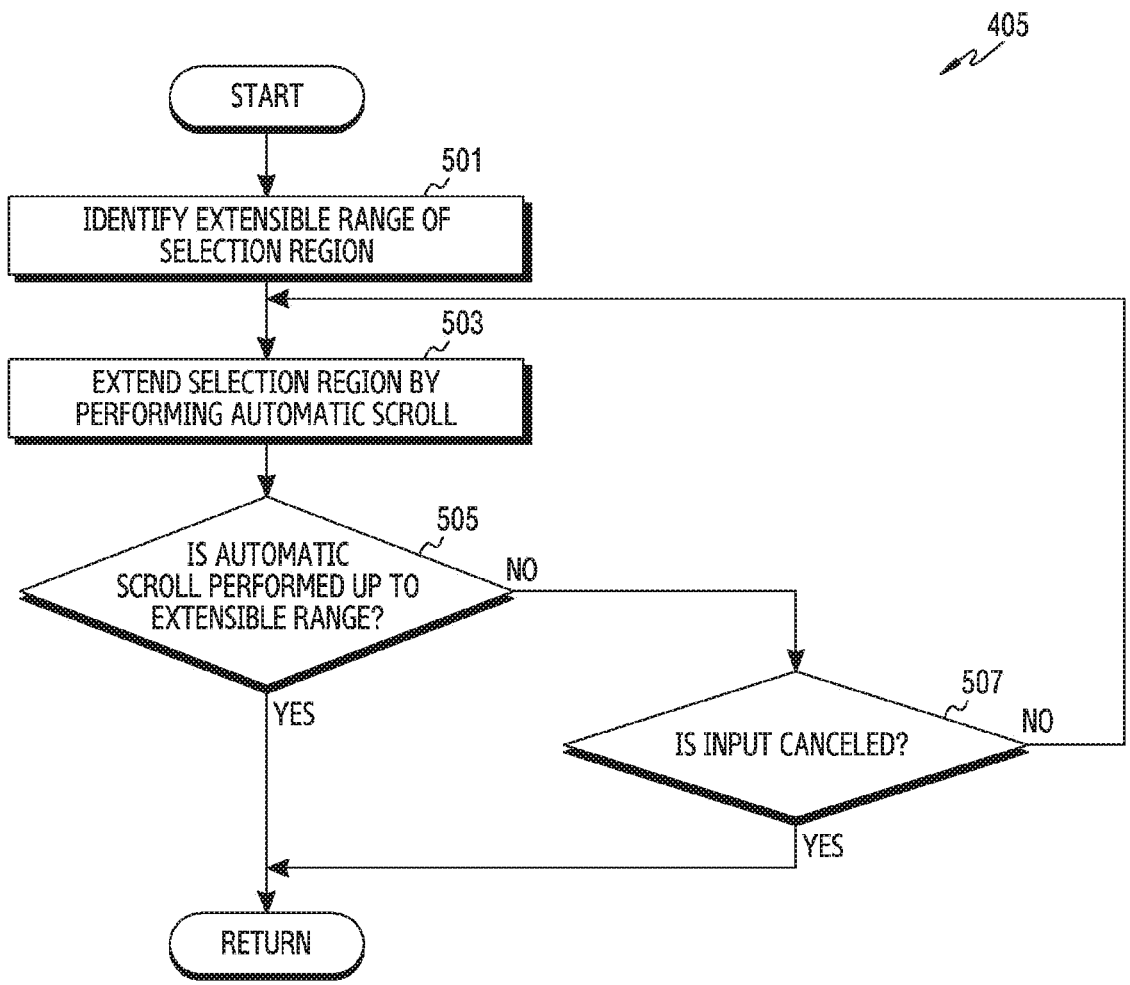
FIG. 5 is a flowchart illustrating extension of a selection region by an electronic device according to various embodiments of the present disclosure.

FIG. 5 is a flowchart illustrating extension of a selection region by an electronic device according to various embodiments of the present disclosure. Hereinafter, referring to FIG. 5, a description will be made of an operation of extending a selection region by performing an automatic scroll in operation 405 of FIG. 4.

Referring to FIG. 5, in operation 501, when determining an automatic scroll (e.g., operation 403 of FIG. 4), the electronic device (e.g., the electronic device 101 or 201) may identify an extensible range for a change of a selection region. For example, when determining execution of an automatic scroll in operation 403 of FIG. 4, the processor 120 may identify an extensible range for a change of a selection region on the basis of whether contents displayed on the display 160 are grouped. For example, when the contents displayed on the display 160 are grouped, the processor 120 may identify an end point of a group including a content included in the selection region. For example, when the contents displayed on the display 160 are not grouped, the processor 120 may identify the display position of the last content among the contents displayed on the display 160. In the present example, the contents may be grouped based on the type, generation time, and a generation zone of each thereof.

In operation 503, the electronic device may extend the selection region by performing an automatic scroll. For example, the processor 120 may extend the selection region up to an extensible range by performing an automatic scroll in the extension direction of the selection region.

In operation 505, the electronic device may identify whether the automatic scroll is performed up to the extensible range for extension of the selection region. For example, when the contents displayed on the display 160 are not grouped, the processor 120 may identify whether the automatic scroll is performed such that the selection region extends to the position of the last content among the contents displayed on the display 160. As another example, when contents displayed on the display 160 are grouped into at least one group, the processor 120 may identify whether the automatic scroll is performed such that the current selection region extends to an end point of a particular group.

In operation 507, when the selection region does not extend to the extensible range, the electronic device may determine whether an input is canceled. For example, when the selection region does not extend to the extensible range, the processor 120 may determine whether a touch input to the touch panel is canceled. As another example, when the selection region does not extend to the extensible range, the processor 120 may determine whether a mouse button input is canceled.

When the input is not canceled, in operation 503, the electronic device may extend the selection region by performing an automatic scroll. For example, when a touch input made by an electronic pen is maintained, the processor 120 may continuously perform the automatic scroll.

Figure 6:
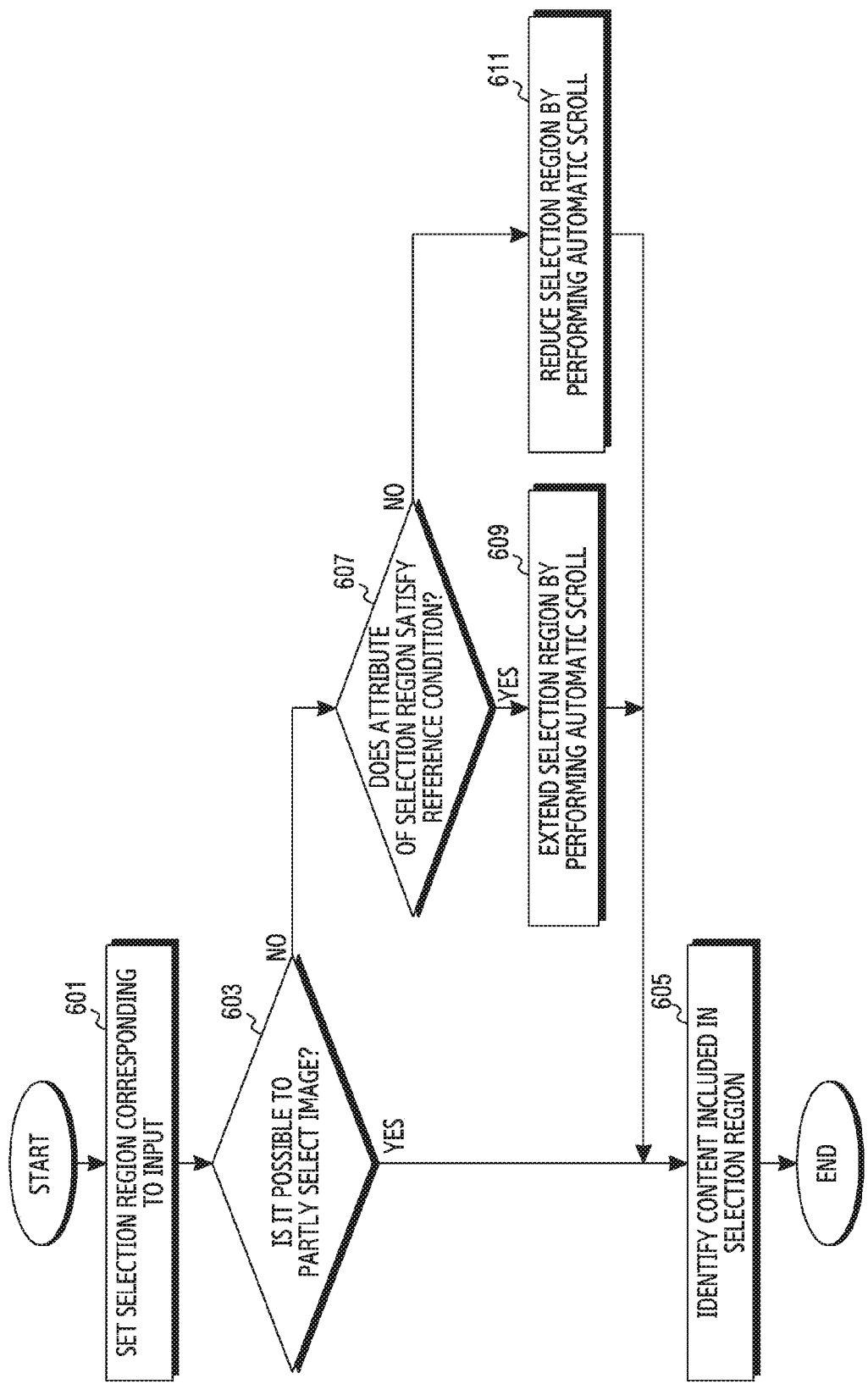
FIG. 6 is a flowchart illustrating a change of a selection region for an image by an electronic device according to various embodiments of the present disclosure.
Figure 7:
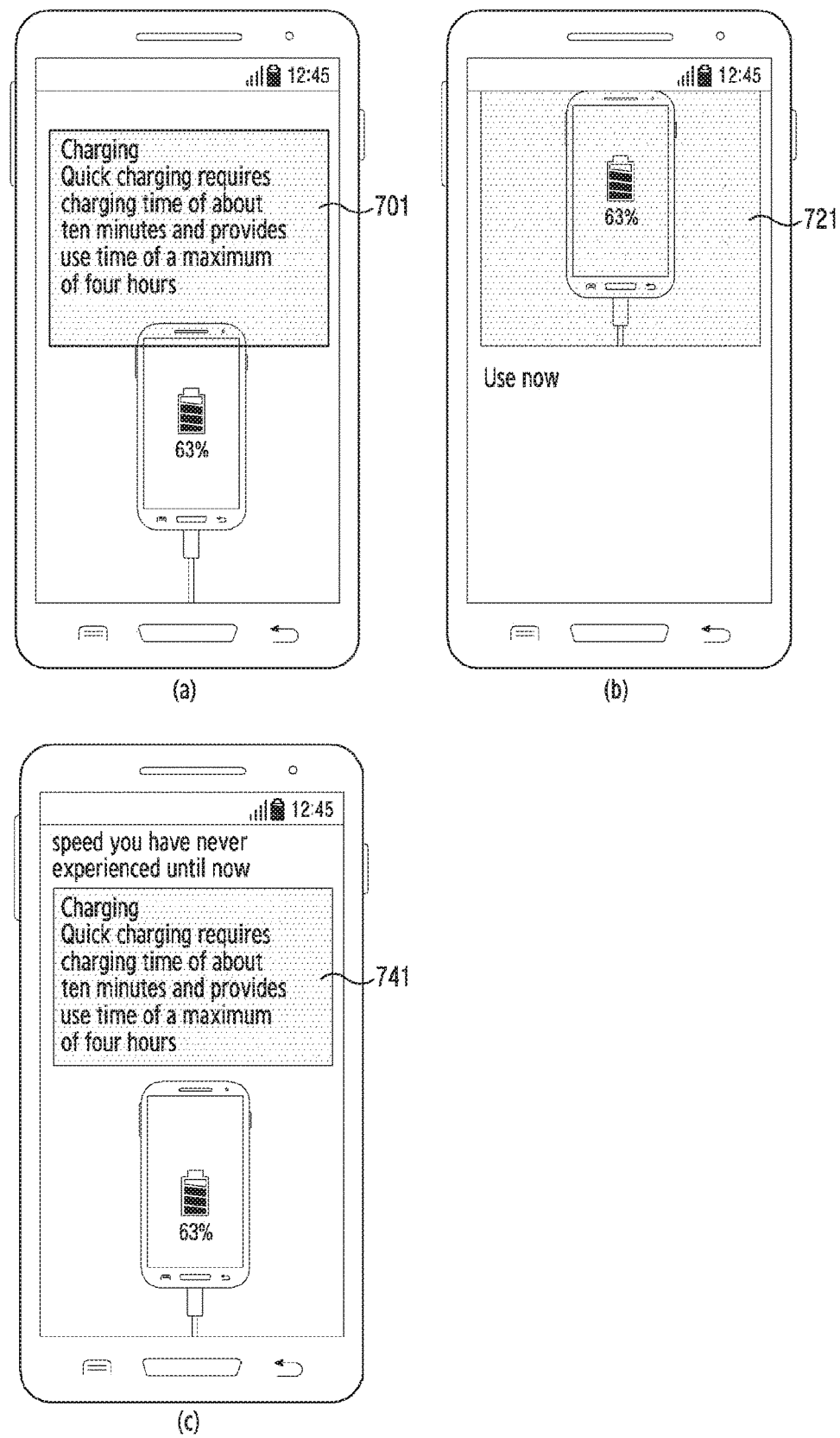
FIG. 7 is a flowchart illustrating an example of identifying of an extensible range of a selection region in an electronic device according to various embodiments of the present disclosure.

FIG. 6 is a flowchart illustrating a change of a selection region for an image by an electronic device according to various embodiments of the present disclosure. Hereinafter, referring to FIG. 6 together with FIG. 7, a description will be made.

Referring to FIG. 6, in operation 601, the electronic device (e.g., the electronic device 101 or 201) may set a selection region corresponding to an input. For example, when a drag input is detected through the touch panel as illustrated in FIG. 7A, the processor 120 may set, as a selection region 701 including a content, a region from a start point of a touch input to a point where the touch input is dragged.

In operation 603, the electronic device may determine whether an image is partly selected. For example, when a function of partly selecting an image is activated, the processor 120 may determine that it is possible to partly select an image. As another example, when the function of partly selecting an image is not activated, the processor 120 may determine that it is impossible to partly select an image. In the present example, the function of partly selecting an image may include a function of selecting at least a part of an image.

In operation 605, when it is possible to partly select an image, the electronic device may identify a content included in the selection region. For example, as illustrated in FIG. 7A, the processor 120 may identify characters and a part of an image included in the selection region 701 among the characters and the image which are output on the display 160.

In operation 607, when it is impossible to partly select an image, the electronic device may determine whether an attribute of the selection region satisfies a reference condition. For example, when it is impossible to partly select an image, the processor 120 may determine whether the size of an image included in the selection region satisfied a reference condition. In the present example, the reference condition may be changed based on the size of an image. For example, the reference condition may become a greater value as the size of an image becomes larger.

In operation 609, when the attribute of the selection region satisfies the reference condition, the electronic device may extend the selection region by performing an automatic scroll. For example, when the size of an image included in the selection region satisfies a reference condition, as illustrated in FIG. 7B, the processor 120 may extend the selection region 721 by performing an automatic scroll such that the remaining part of the image which is not included in the selection region 721 is included therein.

After the electronic device extends the selection region by performing the automatic scroll, in operation 605, the electronic device may identify a content included in the selection region. For example, as illustrated in FIG. 7B, the processor 120 may identify characters and an image included in the extended selection region 721.

In operation 611, when the attribute of the selection region does not satisfy the reference condition, the electronic device may reduce the selection region by performing an automatic scroll. For example, as illustrated in FIG. 7C, when the size of the image included in the selection region does not satisfy the reference condition, the processor 120 may reduce the selection region (as indicated by reference numeral 741) by performing an automatic scroll such that selection of the image included in the selection region is canceled.

After the electronic device reduces the selection region by performing the automatic scroll, in operation 605, the electronic device may identify a content included in the reduced selection region. For example, as illustrated in FIG. 7C, the processor 120 may identify characters included in the reduced selection region 741.

According to various embodiments of the present disclosure, the electronic device may determine whether the selection region is extended or reduced, on the basis of the ratio of an image included in the selection region. For example, when the ratio of the image included in the selection region satisfies a reference condition, the processor 120 may extend the selection region by performing an automatic scroll. As another example, when the ratio of the image included in the selection region does not satisfy the reference condition, the processor 120 may reduce the selection region by performing an automatic scroll. In the present example, the reference condition may be changed based on the size of an image.

Figure 8:
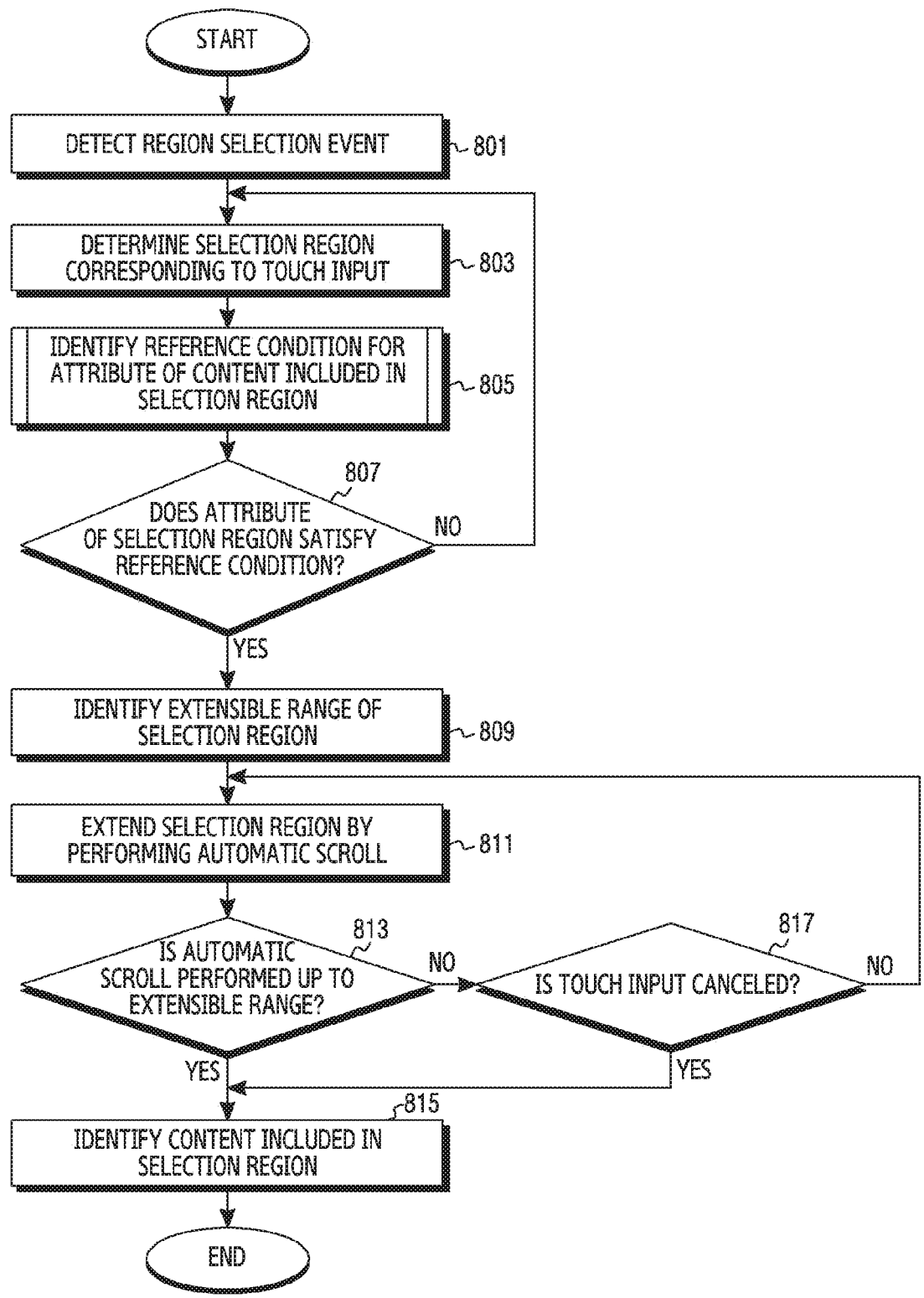
FIG. 8 is a flowchart illustrating a change of a selection region by an electronic device according to various embodiments of the present disclosure.

FIG. 8 is a flowchart illustrating a change of a selection region by an electronic device according to various embodiments of the present disclosure.

Referring to FIG. 8, in operation 801, the electronic device (e.g., the electronic device 101 or 201) may detect a region selection event. For example, when a touch input for selecting a menu icon for selection of a region is detected through the touch panel, the processor 120 may determine that a region selection event is detected. In the present example, the menu icon for selection of a region may be output on at least a partial region of the display 160. As another example, when a touch input for a content output on the display 160 is maintained for a predefined time, the processor 120 may determine that a region selection event is detected.

In operation 803, the electronic device may set a selection region corresponding to the touch input. For example, when detecting a region selection event, the processor 120 may set a selection region for selecting at least one content on the basis of a start point of a touch input for setting a selection region and a touch input point moved by a drag input. For example, the processor 120 may distinguish the selection region from another region by changing at least one of a color, a transparency, a shade, and an outline of the selection region.

In operation 805, the electronic device may identify a reference condition on the basis of an attribute of a content included in the selection region. For example, the processor 120 may identify an attribute of a content included in the selection region. The processor 120 may read, from the memory 130, a reference condition corresponding to an attribute of a content and may identify the same. For example, when characters are included in the selection region, the processor 120 may identify a reference condition for characters. For example, when an image is included in the selection region, the processor 120 may identify a reference condition for capacity of a content. For example, when an image is included in the selection region, the processor 120 may identify a reference condition for an image. In the present example, the attribute of a content may include the type of content, the type of application, or the like.

In operation 807, the electronic device may determine whether an attribute of the selection region satisfies a reference condition. For example, the processor 120 may determine whether the number of the characters included in the selection region satisfies the reference condition for characters. As another example, the processor 120 may determine whether the number of the images included in the selection region satisfies the reference condition for an image.

When the attribute of the selection region does not satisfy the reference condition, in operation 803, the electronic device may additionally set a selection region corresponding to a touch input. For example, when the number of the characters included in the selection region does not satisfy the reference condition for characters, the processor 120 may additionally set a selection region on the basis of a touch input point moved by a drag input.

In operation 809, when the attribute of the selection region satisfies the reference condition, the electronic device may identify an extensible range of the selection region. For example, when the number of the characters included in the selection region satisfies the reference condition for characters, the processor 120 may determine whether contents displayed on the display 160 are grouped. When the contents displayed on the display 160 are grouped, the processor 120 may identify an end point of a group including a content included in the selection region. When the contents displayed on the display 160 are not grouped, the processor 120 may identify a point where the last content among the contents displayed on the display 160 is located. In the present example, the contents may be grouped based on the types thereof, generation information (e.g., generation time and generation zones) thereof, and the like.

In operation 811, the electronic device may extend the selection region by performing an automatic scroll. For example, the processor 120 may identify a direction in which a touch input for setting a selection region is dragged. The processor 120 may extend the selection region by performing an automatic scroll in a direction corresponding to the direction in which the touch input is dragged.

In operation 813, the electronic device may identify whether an automatic scroll is performed up to the extensible range while the automatic scroll is performed. For example, when the contents output on the display 160 are grouped, the processor 120 may determine whether the automatic scroll is performed up to an end point of a group including the characters included in the selection region. As another example, when the contents output on the display 160 are not grouped, the processor 120 may determine whether the automatic scroll is performed up to the position of the last image among continuous images having the same generation information (e.g., a generation time point, a generation zone, etc.) as the image included in the selection region while the automatic scroll is performed.

In operation 815, when the automatic scroll is performed up to the extensible range, the electronic device may identify contents included in the extended selection region. For example, when the automatic scroll is performed up to an end point of a paragraph including the characters included in the selection region, the processor 120 may identify characters included in the extended selection region. As another example, when the automatic scroll is performed up to the position of the last image among continuous images having the same generation information as the image included in the selection region, the processor 120 may identify images included in the extended selection region.

In operation 817, when the automatic scroll is not performed up to the extensible range, the electronic device may determine whether a touch input for determining a selection region is canceled. For example, when the automatic scroll is not performed up to the extensible range, the processor 120 may determine whether a touch input for setting a selection region is detected through the touch panel.

When the touch input for setting a selection region is maintained, in operation 811, the electronic device may extend the selection region by continuously performing the automatic scroll. For example, when an input for setting a selection region is continuously detected through the touch panel, the processor 120 may extend the selection region by continuously performing the automatic scroll.

When the touch input for setting a selection region is canceled, in operation 815, the electronic device may identify a content included in the selection region. For example, when a touch input for setting a selection region is not detected through the touch panel, the processor 120 may identify a character, an image, a video, and the like included in the selection region.

Figure 9:
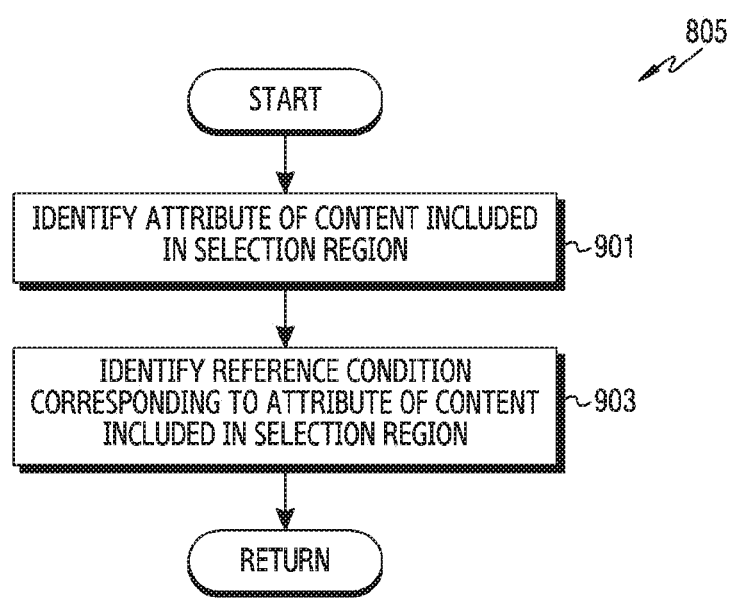
FIG. 9 is a flowchart illustrating identifying of a reference condition for execution of an automatic scroll by an electronic device according to various embodiments of the present disclosure.

FIG. 9 is a flowchart illustrating identifying of a reference condition for execution of an automatic scroll by an electronic device according to various embodiments of the present disclosure. Hereinafter, referring to FIG. 9 together with FIGS. 10A to 10C, a description will be made of an operation of identifying a reference condition on the basis of an attribute of a content included in a selection region in operation 805 of FIG. 8.

Figure 10A:
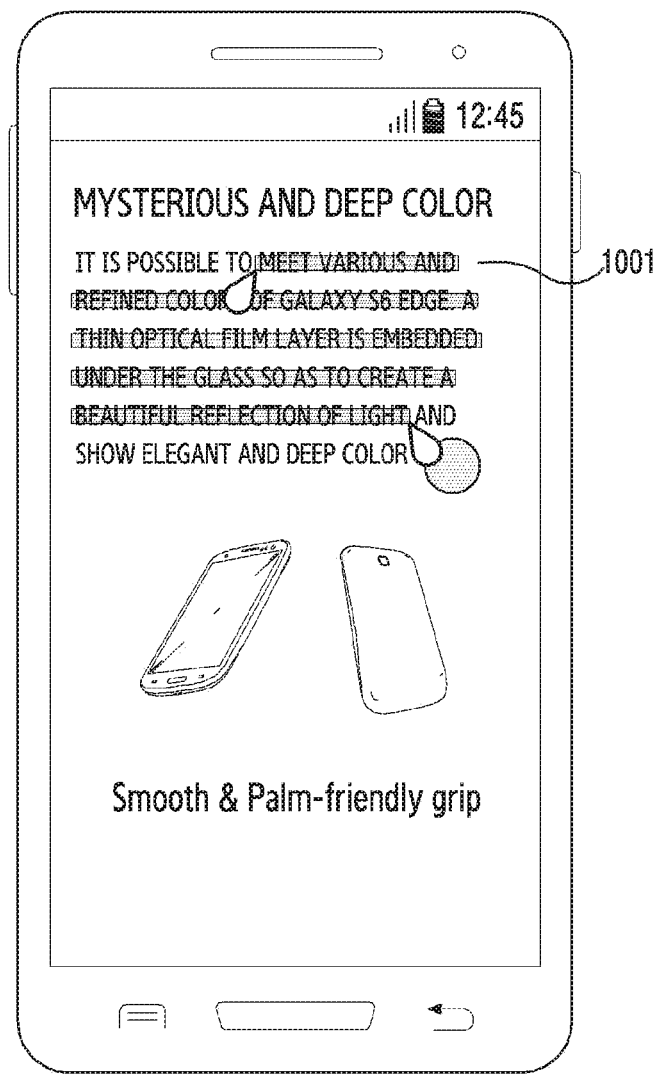
FIGS. 10A to 10C each illustrate a screen configuration for identifying of a reference condition in an electronic device according to various embodiments of the present disclosure.
Figure 10B:
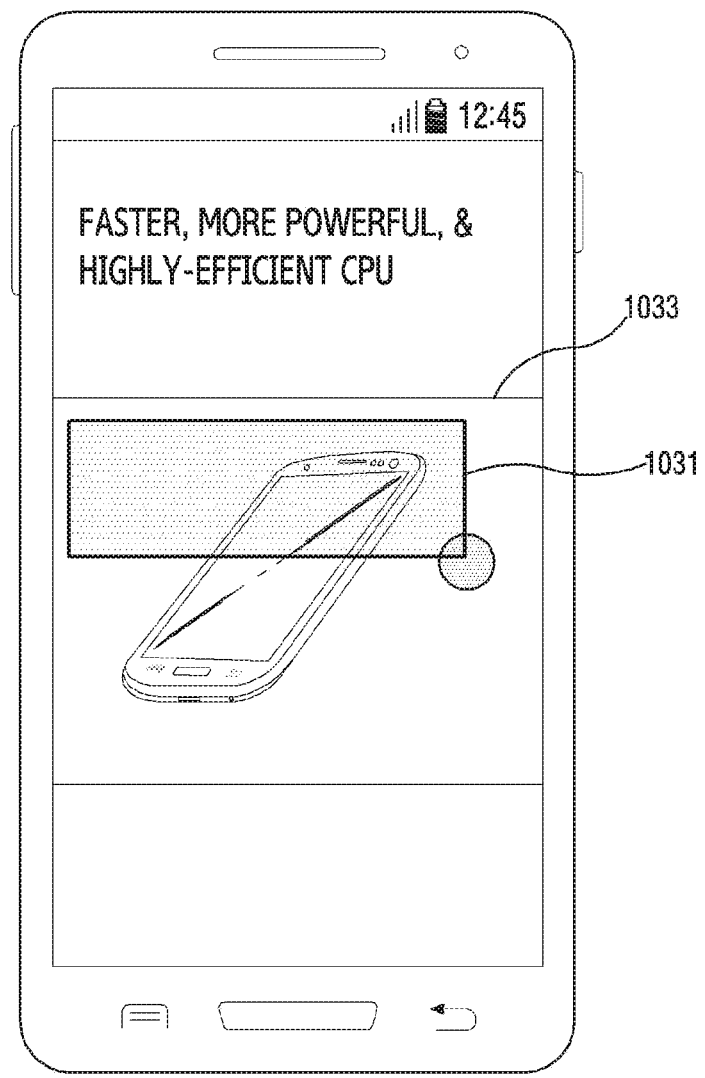
Figure 10C:
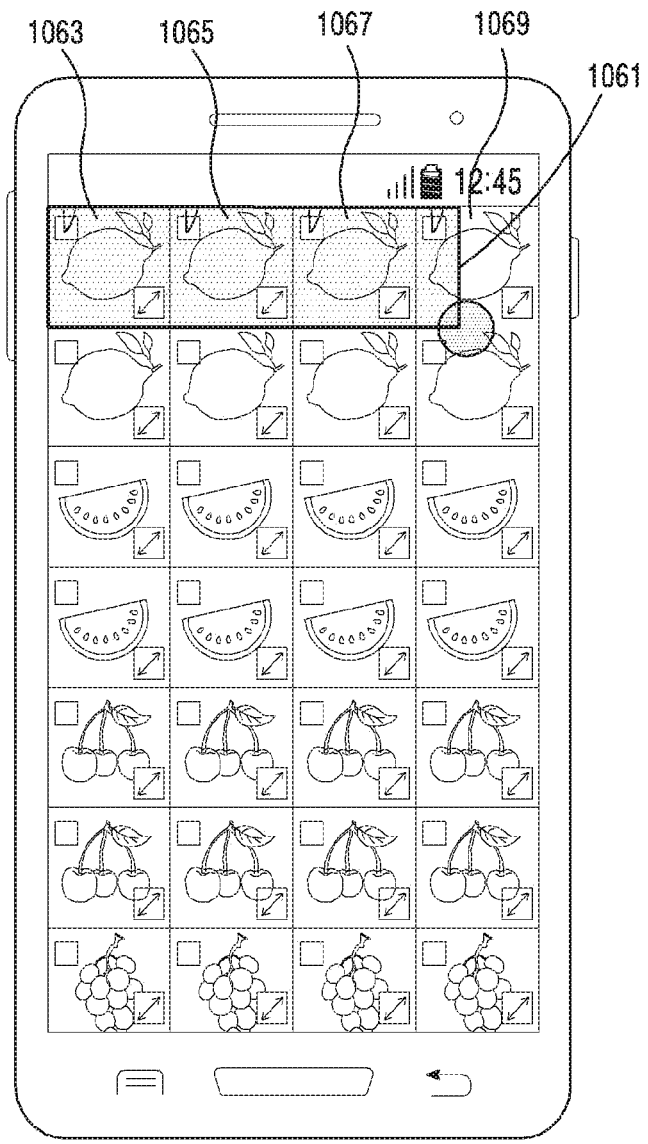

Referring to FIG. 9, in operation 901, when a selection region corresponding to a touch input is set, the electronic device (e.g., the electronic device 101 or 201) may identify an attribute of a content included in the selection region. For example, when a browser for web search is executed as illustrated in FIG. 10A, the processor 120 may identify that a content included in a selection region 1001 is characters. As another example, when a browser for web search is executed as illustrated in FIG. 10B, the processor 120 may identify that a content included in a selection region 1031 is an image 1033. As still another example, when a gallery for providing an image is executed as illustrated in FIG. 10C, the processor 120 may identify that a content included in a selection region 1061 is multiple images 1063 to 1069.

In operation 903, the electronic device may identify a reference condition on the basis of an attribute of a content included in the selection region. For example, when the characters are included in the selection region 1001 as illustrated in FIG. 10A, the processor 120 may identify a predetermined reference condition corresponding to the number of characters. As another example, when a part of the image 1033 is included in the selection region 1031 as illustrated in FIG. 10B, the processor 120 may identify a reference condition corresponding to the entire size of the relevant image 1033. For example, when the entire size of the image 1033 is larger than or equal to one-half of the size of the display 160, the processor 120 may identify a reference condition corresponding to 10% of the size of the relevant image 1033. As still another example, when the multiple images 1063 to 1067 are included in the selection region 1061 as illustrated in FIG. 10C, the processor 120 may identify a predetermined reference condition corresponding to the number of images.

Figure 11:
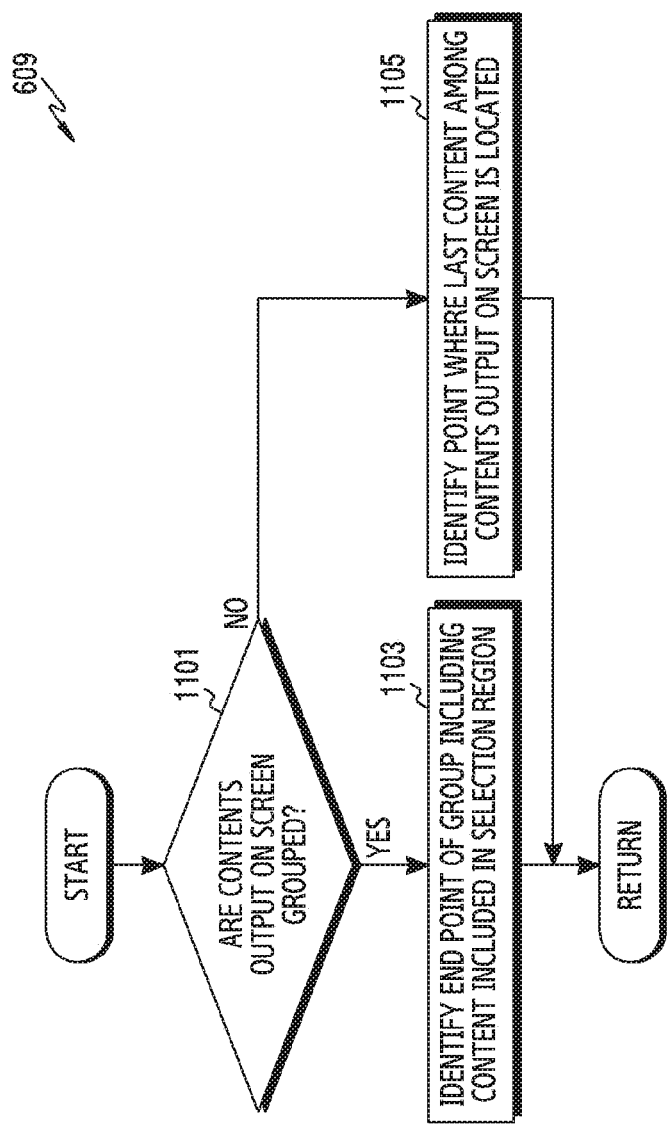
FIG. 11 is a flowchart illustrating a case in which an electronic device identifies an extensible range of a selection region on the basis of grouping according to various embodiments of the present disclosure.

FIG. 11 is a flowchart illustrating a case in which an electronic device identifies an extensible range of a selection region on the basis of grouping according to various embodiments of the present disclosure. Hereinafter, referring to FIG. 11 together with FIGS. 12 to 14, a description will be made of an operation of identifying an extensible range of a selection region in operation 809 of FIG. 8.

Figure 12:
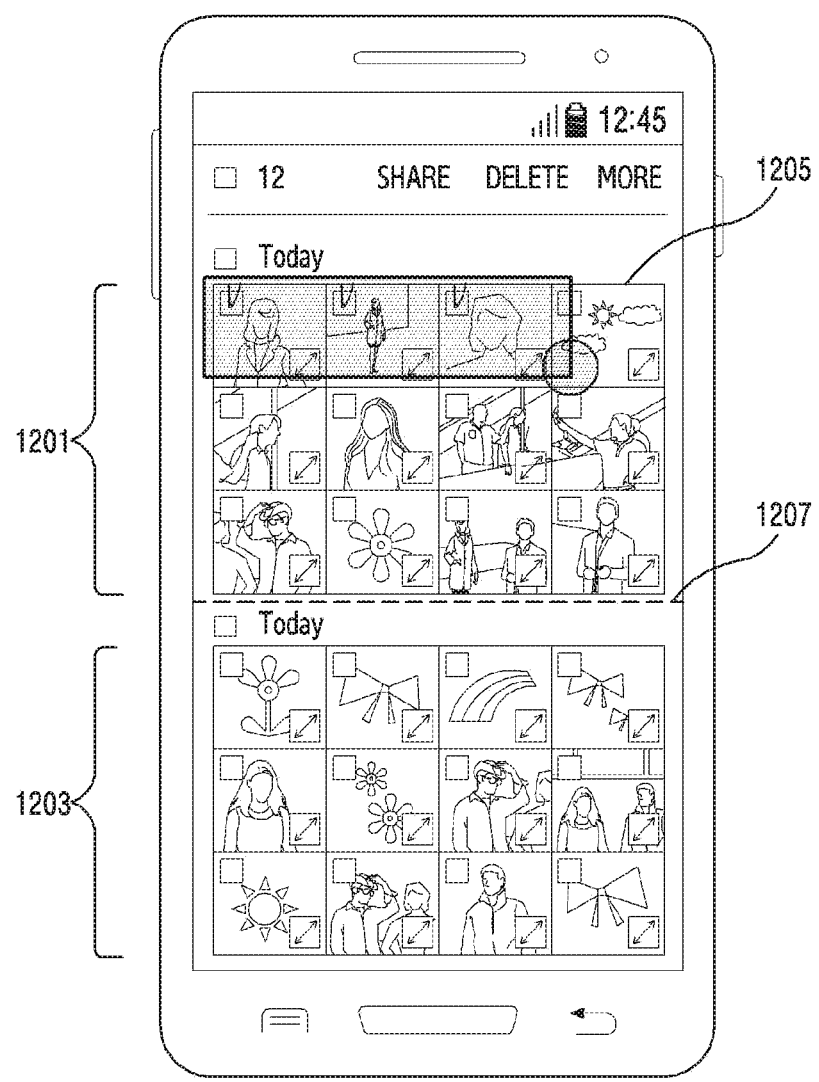
FIG. 12 illustrates a screen configuration for identifying of an extensible range of a selection region in an electronic device according to various embodiments of the present disclosure.
Figure 13:
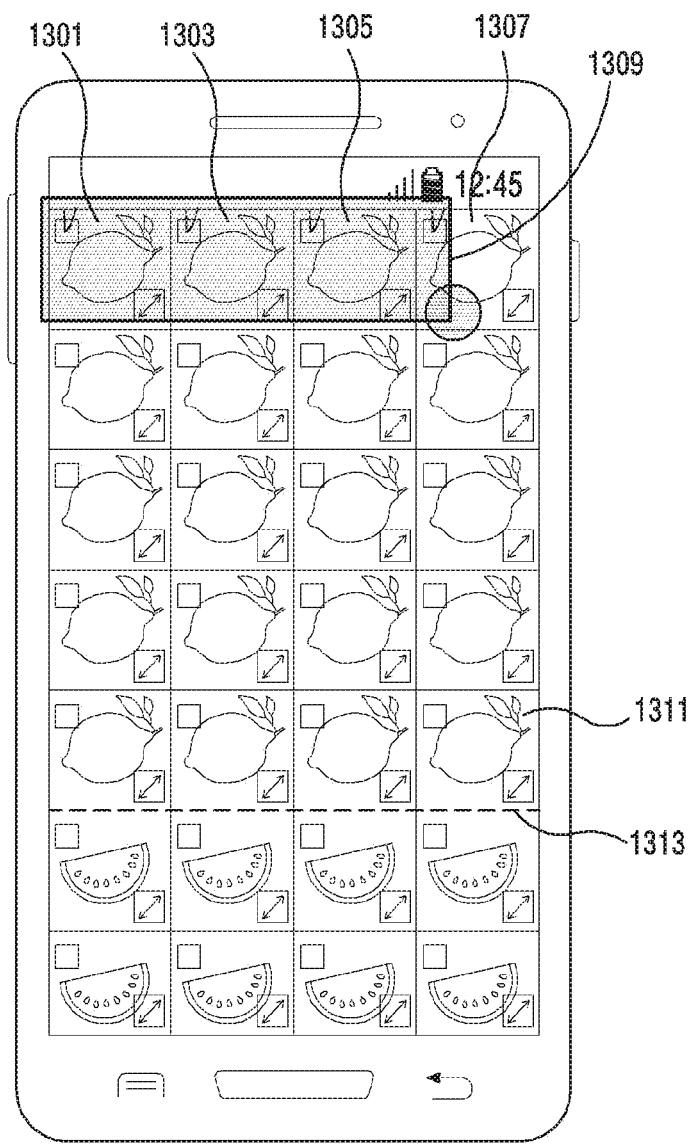
FIG. 13 illustrates a screen configuration for identifying of an extensible range of a selection region in an electronic device according to various embodiments of the present disclosure.
Figure 14:
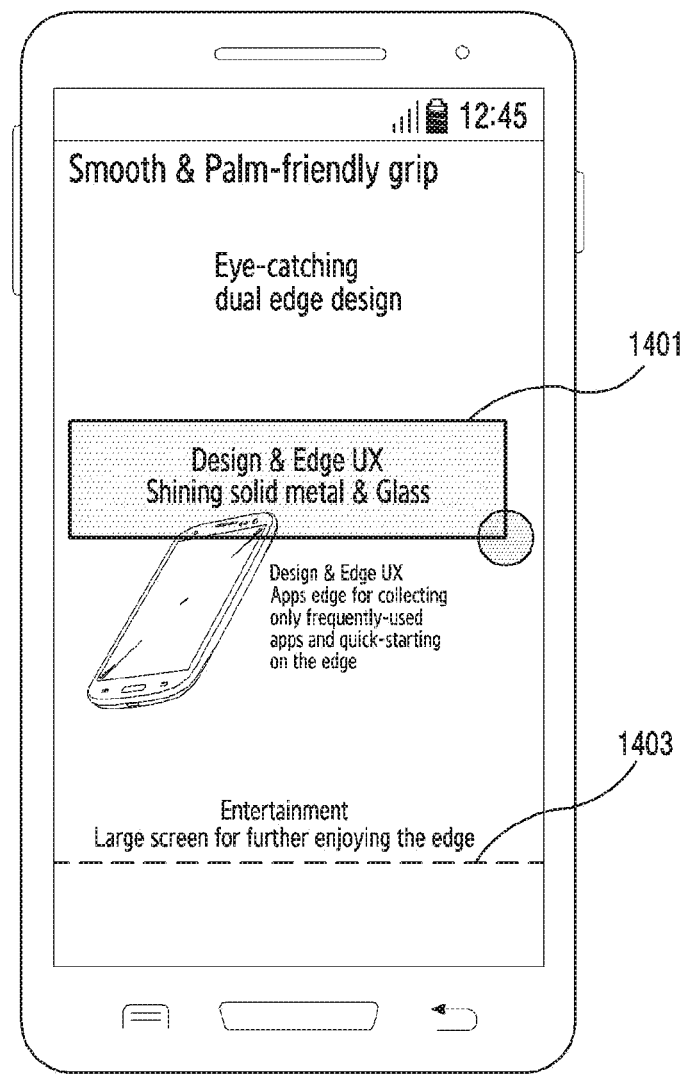
FIG. 14 illustrates a screen configuration for identifying of an extensible range of a selection region in an electronic device according to various embodiments of the present disclosure.

Referring to FIG. 11, in operation 1101, when an attribute of a selection region satisfies a reference condition, the electronic device (e.g., the electronic device 101 or 201) may determine whether contents output on a screen are grouped. For example, when an attribute of a selection region satisfies a reference condition in operation 807 of FIG. 8, the processor 120 may determine whether contents output on a screen are grouped based on the types thereof, generation time points thereof, generation zones thereof, and the like. For example, when, while a gallery is executed as illustrated in FIG. 12, images are classified into a first group 1201 and a second group 1203 according to generation time points thereof so as to display the first and second groups 1201 and 1203, the processor 120 may determine that the images output on a screen are grouped. For example, when, while a gallery is executed as illustrated in FIG. 13, images generated at the same time are continuously arranged and output according to time information, the processor 120 may determine that the images output on a screen are grouped. For example, when, while a browser is executed as illustrated in FIG. 14, characters and an image are output in the same region without distinguishing therebetween, the processor 120 may determine that the characters and the image output on a screen are not grouped.

In operation 1103, when the contents output on the screen are grouped, the electronic device may identify an end point of a group including a content included in the selection region. For example, when the images displayed on the display 160 are grouped into the first group 1201 and the second group 1203 as illustrated in FIG. 12, the processor 120 may identify an end point 1207 of the first group 1201 including images included in the selection region 1207. As another example, when images 1301 to 1307 displayed on the display 160 are arranged and output according to generation time information as illustrated in FIG. 13, the processor 120 may identify an end point 1313 of a last image 1311 among continuous images having the same generation time as images included in the selection region 1309.

In operation 1105, when the contents output on the screen are not grouped, the electronic device may identify a point where the last content among the contents output on the screen is located. For example, when the characters and the image are not grouped as illustrated in FIG. 14, the processor 120 may identify an end point 1403 of characters located at the lowest position among the characters and the image output on the display 160.

According to various embodiments of the present disclosure, when contents output on a screen are grouped, the electronic device may also identify an end point of one group among groups after a group including a content included in a selection region. For example, when contents output on a screen are grouped into three groups, the processor 120 may identify a first group including a content included in a selection region. The processor 120 may also identify an end point of one group among a second group and a third group existing after the first group.

Figure 15:
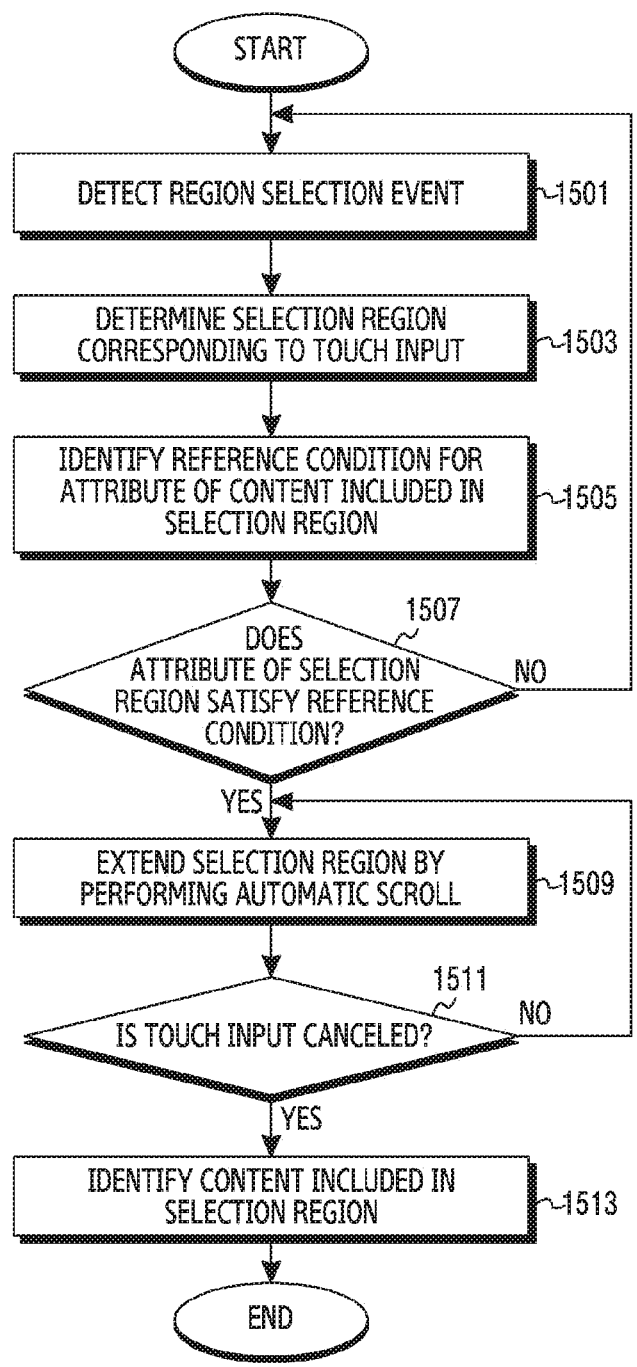
FIG. 15 is a flowchart illustrating a change of a selection region by an electronic device according to various embodiments of the present disclosure.

FIG. 15 is a flowchart illustrating a change of a selection region by an electronic device according to various embodiments of the present disclosure.

Referring to FIG. 15, in operation 1501, the electronic device (e.g., the electronic device 101 or 201) may detect a region selection event on the basis of an input. For example, when a touch input, output from the tough panel, for a content is maintained for a predetermined time or when an input for selecting a menu icon for selection of a region is detected, the processor 120 may determine that a region selection event is detected.

In operation 1503, the electronic device may set a selection region corresponding to the touch input. For example, the processor 120 may set a selection region for selecting at least one content on the basis of a start point of the touch input and a touch input point moved by execution of a drag. For example, the processor 120 may renew a graphic element such as a color, a transparency, a shade, and an outline of the selection region so as to distinguish the selection region from another region.

In operation 1505, the electronic device may identify a reference condition on the basis of an attribute of a content included in the selection region. For example, the processor 120 may identify the type of content included in the selection region, and then may identify a reference condition corresponding to the type of content. As another example, the processor 120 may identify the area of the selection region, and then may identify a reference condition corresponding to the area.

In operation 1507, the electronic device may determine whether an attribute of the selection region satisfies the reference condition. For example, the processor 120 may determine whether the number of characters included in the selection region satisfies a reference condition corresponding to characters. As another example, the processor 120 may determine whether the size of the selection region satisfies a reference condition for the size of a selection region. As still another example, the processor 120 may determine whether the number of images included in the selection region satisfies a reference condition for an image.

When the attribute of the selection region does not satisfy the reference condition, in operation 1503, the electronic device may again set a selection region corresponding to a touch input. For example, when the attribute of the selection region does not satisfy the reference condition, the processor 120 may again set a selection region so as to include a character, an image, a video, and the like corresponding to a touch input moved by a drag input, starting from a start point of a touch input.

In operation 1509, when the attribute of the selection region satisfies the reference condition, the electronic device may extend the selection region by performing an automatic scroll. For example, when the attribute of the selection region satisfies the reference condition, the processor 120 may perform an automatic scroll in a direction corresponding to the direction of the touch input.

In operation 1511, the electronic device may determine whether the touch input for setting a selection region is canceled. For example, the processor 120 may determine whether a touch input for setting a selection region is not detected through the input/output interface 150.

When the touch input for setting a selection region is maintained, in operation 1509, the electronic device may continuously perform the automatic scroll. For example, when the touch input is continuously detected through the touch panel, the processor 120 may continuously perform the automatic scroll.

In operation 1513, when the touch input for setting a selection region is canceled, the electronic device may identify a content included in the selection region. For example, when the touch input to the touch panel is canceled, the processor 120 may identify a character, an image, a video, and the like included in the selection region.

Figure 16:
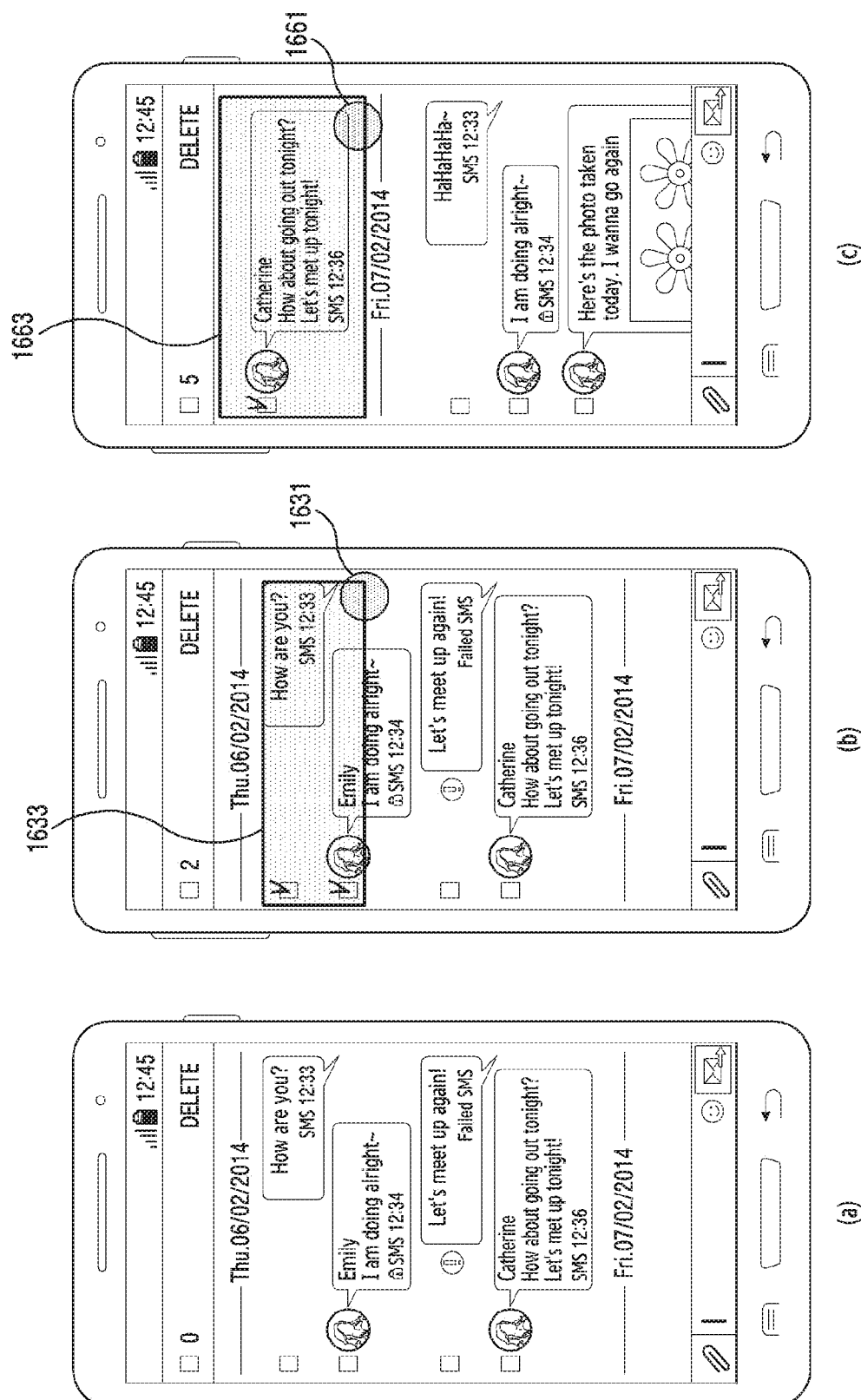
FIG. 16 illustrates an example in which, when executing a message application, an electronic device changes a selection region according to various embodiments of the present disclosure.

FIG. 16 is a view illustrating an example in which, when executing a message application, an electronic device changes a selection region according to various embodiments of the present disclosure.

For example, when a message application is executed as illustrated in FIG. 16A, as illustrated in FIG. 16B, the electronic device (e.g., the electronic device 101 or 201) may set a selection region 1633 corresponding to a start point of a touch input for setting a selection region and a touch input point 1631 moved by a drag input. The electronic device may determine whether the number of messages included in the selection region 1633 satisfies a reference condition corresponding to characters of a message application. When the number of the messages included in the selection region 1633 satisfies the reference condition, as illustrated in FIG. 16C, the electronic device may extend the selection region 1663 by performing an automatic scroll. For example, when the output messages are grouped according to time, as illustrated in FIG. 16C, the electronic device may extend the selection region 1663 by performing an automatic scroll so as to include all messages transmitted/received at the same date as a message included in the selection region. In the present example, the touch input point 1631 before performing the automatic scroll as illustrated in FIG. 16B may be identical to a touch input point 1661 after extending the selection region by performing the automatic scroll as illustrated in FIG. 16C. The electronic device may identify a message included in the extended selection region 1663.

Figure 17:
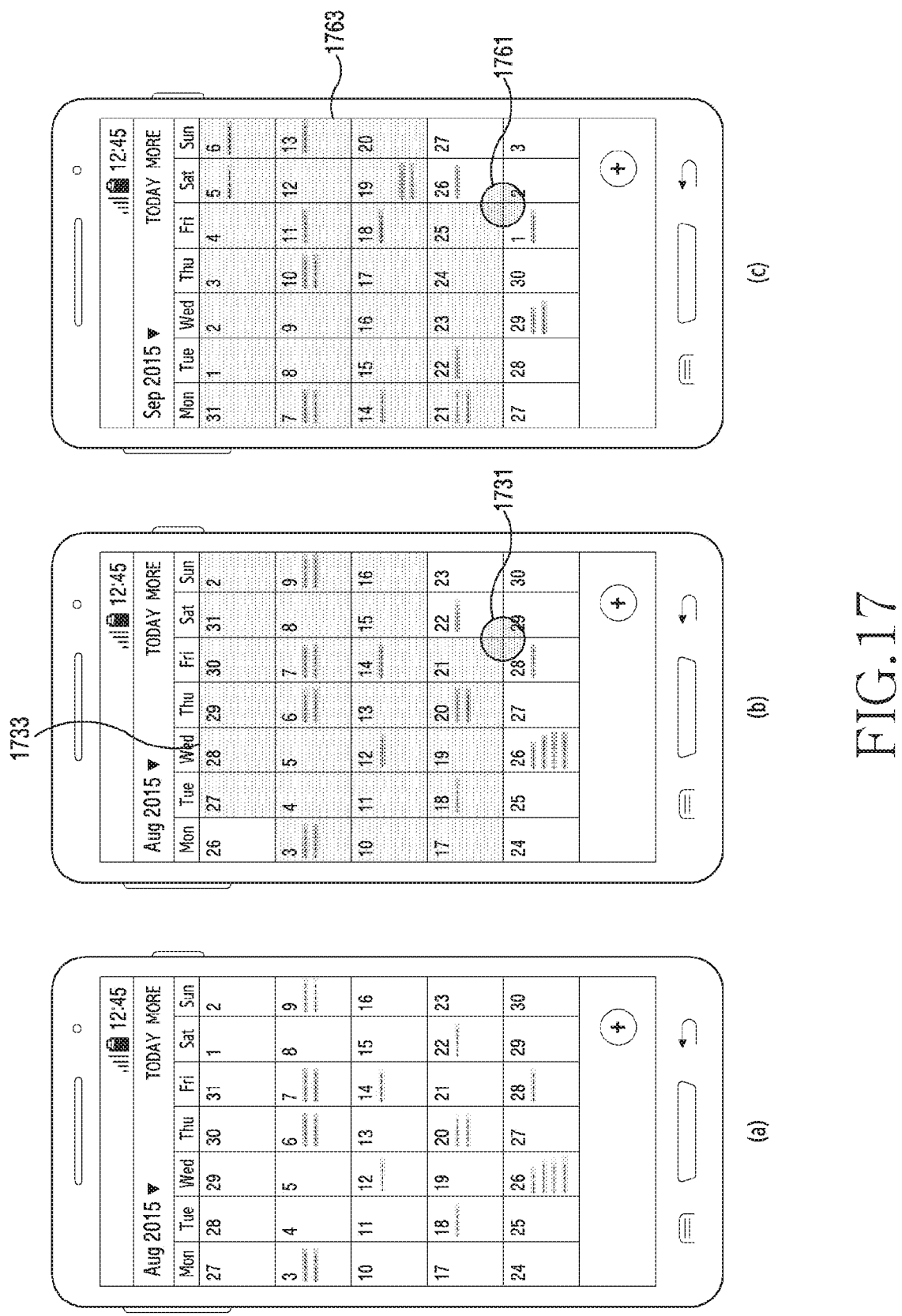
FIG. 17 illustrates an example in which, when executing a calendar application, an electronic device changes a selection region according to various embodiments of the present disclosure.

FIG. 17 is a view illustrating an example in which, when executing a calendar application, an electronic device changes a selection region according to various embodiments of the present disclosure.

For example, when a calendar application is executed as illustrated in FIG. 17A, as illustrated in FIG. 17B, the electronic device (e.g., the electronic device 101 or 201) may set a selection region 1733 for selecting at least one data on the basis of a start point of a touch input for setting the selection region 1733 and a touch input point 1731 moved by a drag input. The electronic device may determine whether the number of dates included in the selection region 1733 satisfies a reference condition corresponding to a date of a calendar application. When the number of the dates included in the selection region 1733 satisfies the reference condition, as illustrated in FIG. 17C, the electronic device may extend the selection region (as indicated by reference numeral 1763) by performing an automatic scroll so that a date at a position corresponding to the touch input point 1761 moved by the drag input in the next month is located at a touch input point 1761. The electronic device may identify a date included in the selection region 1733.

The term "module" used in various exemplary embodiments of the present disclosure refers to a unit including one of hardware, software, and firmware, or a combination of two or more of them, for example. For example, the "module" may be used interchangeably with terms "unit," "logic," "logical block," "component" or "circuit." The "module" may be a minimum unit of an integrally configured component or a part of it. The "module" may be a minimum unit that performs one or more functions or a part of it. The "module" may be implemented mechanically or electronically. For example, the "module" may include at least one of an Application-Specific Integrated Circuit (ASIC) chip, Field-Programmable Gate Arrays (FPGAs), and a programmable logic device, which perform any operation that is already well known or will be developed in the future.

At least part of the apparatus (for example: modules or functions thereof) or method (for example: operations) according to various exemplary embodiments may be implemented by using instructions stored in computer-readable storage media in the form of a program module. When the instructions are executed by a processor (for example: the processor 120), the one or more processors may perform a function corresponding to the instructions. The computer-readable storage media may be the memory 130, for example.

Examples of the computer-readable recording media include hard disks, floppy disks and magnetic media (for example, magnetic tapes), optical media (for example, a Compact Disc Read Only Memory (CD-ROM) and a Digital Versatile Disc (DVD), magneto-optical media (for example, floptical disks)), and hardware devices (for example, a Read Only Memory (ROM), a Random Access Memory (RAM) and a flash memory). Examples of the program commands include machine language codes created by a compiler, and high-level language codes that can be executed by a computer by using an interpreter. The above-described hardware devices may be configured to operate as one or more software modules for performing operations of various exemplary embodiments, and vice versa.

A module or program module according to various exemplary embodiments of the present disclosure may include one or more of the above-described elements, may omit some elements, or may further include additional elements. The operations performed by the module, the program module, or the other elements according to various exemplary embodiments of the present disclosure may be performed serially, in parallel, repeatedly, or heuristically. In addition, some operations may be performed in different order or may be omitted, and an additional operation may be added. The various exemplary embodiments disclosed in the present specification and drawings are merely suggested to easily explain the technical features and assist easy understanding, and are not intended to limit the technical scope disclosed in the various exemplary embodiments of the present disclosure. Therefore, the scope of the various exemplary embodiments of the present disclosure should be interpreted as including all changes or various other embodiments derived based on the technical idea of the various exemplary embodiments of the present disclosure.

The invention claimed is:

1. An electronic device comprising:
a display; and
a processor configured to:
set a selection region based on an input including a portion of an image displayed on the display;
identify a reference condition associated with the image included in the selection region;
determine whether a size of the image included in the selection region satisfies the reference condition;
in response to determining that the size of the image included in the selection region satisfies the reference condition, extend the selection region by performing an automatic scroll to include another portion of the image which is not included in the selection region;
in response to determining that the size of the image included in the selection region does not satisfy the reference condition, reduce the selection region by performing an automatic scroll to exclude the portion of the image which is included in the selection region; and
display the content included in the extended selection region or the reduced selection region.

2. The electronic device of claim 1, wherein the processor is further configured to:
determine whether the automatic scroll is performed by comparing the size of the image included in the selection region with the reference condition.

3. The electronic device of claim 1, wherein the processor is further configured to:
identify an extensible range of the selection region; and
in response to the selection region being changed to the extensible range through the automatic scroll, terminate the automatic scroll.

4. The electronic device of claim 3, wherein the processor is further configured to:
in response to at least one image displayed on the display being grouped into multiple groups, identify the extensible range of the selection region including at least one group among the multiple groups.

5. The electronic device of claim 3, wherein the processor is further configured to:
in response to at least one image displayed on the display not being grouped, identify the extensible range of the selection region corresponding to a display position of a last image among the at least one image displayed on the display.

6. The electronic device of claim 1, wherein the processor is further configured to:
in response to an input for setting the selection region being canceled during performance of the automatic scroll, terminate the automatic scroll.

7. The electronic device of claim 1, wherein the input for setting the selection region comprises a touch input or a mouse button input.

8. An operating method of an electronic device, the operating method comprising:
setting a selection region based on an input including a portion of an image displayed on a display of the electronic device;
identifying a reference condition associated with the image included in the selection region;
determining whether a size of the image included in the selection region satisfies the reference condition;
in response to determining that the size of the image included in the selection region satisfies the reference condition, extending the selection region by performing an automatic scroll to include another portion of the image which is not included in the selection region;
in response to determining that the size of the image included in the selection region does not satisfy the reference condition, reducing the selection region by performing an automatic scroll to exclude the portion of the image which is included in the selection region;
displaying the content included in the extended selection region or the reduced selection region.

9. The operating method of claim 8, further comprising:
determining whether the automatic scroll is performed by comparing the size of the image included in the selection region with the reference condition.

10. The operating method of claim 8, further comprising:
identifying an extensible range of the selection region; and
in response to the selection region being changed to the extensible range through the automatic scroll, terminating the automatic scroll.

11. The operating method of claim 8, further comprising:
in response to at least one image displayed on the display being grouped into multiple groups, identifying the extensible range of the selection region including at least one group among the multiple groups.

12. The operating method of claim 8, further comprising:
in response to at least one image displayed on the display not being grouped, identifying the extensible range of the selection region corresponding to a display position of a last image among the at least one image displayed on the display.

13. The operating method of claim 8, further comprising:
in response to an input for setting the selection region being canceled during performing of the automatic scroll, terminating the automatic scroll.

14. The operating method of claim 8, wherein the input for setting the selection region comprises a touch input or a mouse button input.

* * * * *